United States Patent
Guedez et al.

(10) Patent No.: US 12,078,317 B2
(45) Date of Patent: Sep. 3, 2024

(54) ELECTRIC LIGHTING SYSTEM AND COMPONENTS, AND CHARGING AND CONNECTION MECHANISMS THEREOF

(71) Applicant: Polygroup Limited (Macao Commercial Offshore), De Macau (MO)

(72) Inventors: Baptiste Robin Guedez, Central (HK); Yifeng Zhang, Dongguan (CN); Shuangyi Lyu, Dongguan (CN); Will Jin, Shantou (CN); Victor Hugo Ocegueda Gallaga, Baja California (MX)

(73) Assignee: Polygroup Limited (Macao Commercial Offshore), De Macau (MO)

( * ) Notice: Subject to any disclaimer, the term of this patent is extended or adjusted under 35 U.S.C. 154(b) by 0 days.

(21) Appl. No.: 17/304,819

(22) Filed: Jun. 25, 2021

(65) Prior Publication Data
US 2021/0396367 A1    Dec. 23, 2021

Related U.S. Application Data

(63) Continuation-in-part of application No. 16/967,575, filed as application No. PCT/US2019/019914 on Feb. 27, 2019.
(Continued)

(51) Int. Cl.
*F21S 9/02* (2006.01)
*F21S 10/04* (2006.01)
(Continued)

(52) U.S. Cl.
CPC .............. *F21S 9/02* (2013.01); *F21S 10/04* (2013.01); *F21V 23/06* (2013.01); *H02J 7/0013* (2013.01); *H02J 7/0042* (2013.01)

(58) Field of Classification Search
CPC ...... H02J 7/0013; H02J 7/0042; H02J 7/0047; H02J 7/0018; H02J 7/0027; H02J 7/0045;
(Continued)

(56) References Cited

U.S. PATENT DOCUMENTS 5,754,124 A * 5/1998 Daggett ................ H02J 7/0042
                                                        340/908.1
5,900,715 A * 5/1999 Roberts ................ H01M 10/46
                                                        320/115
(Continued)

FOREIGN PATENT DOCUMENTS

EP           3151339        4/2017
WO           2003089838     10/2003
WO      WO-2007099412 A1 *  9/2007  ............ H02J 7/0044

OTHER PUBLICATIONS

International Search Report for PCT/US2019/019914, dated Jun. 26, 2019, 1 pages.
(Continued)

*Primary Examiner* — Peggy A Neils
*Assistant Examiner* — James M Endo
(74) *Attorney, Agent, or Firm* — GREENBERG TRAURIG LLP; Trenton A. Ward

(57) ABSTRACT

Lighting systems may include a group charging station and a lighting device. The group charging stations may include a plurality of power devices operable to power the lighting device, the plurality of power devices including a first power device and a second power device, the first power device including a first plurality of electrical contacts, the second power device including a second plurality of electrical contacts, and a group charging platform operable to concurrently charge the plurality of power devices.

21 Claims, 19 Drawing Sheets

Related U.S. Application Data

(60) Provisional application No. 62/635,606, filed on Feb. 27, 2018.

(51) Int. Cl.
*F21V 23/06* (2006.01)
*H02J 7/00* (2006.01)

(58) Field of Classification Search
CPC .... H02J 7/00043; H02J 7/0014; H02J 7/0019; H02J 7/0024; H02J 7/0044; H02J 7/00; F21S 9/02; F21V 21/096; F21V 21/0965
USPC .......................... 320/115, 108; 362/157–208
See application file for complete search history.

(56) References Cited

U.S. PATENT DOCUMENTS

| | | | | |
|---|---|---|---|---|
| 6,819,080 B2* | 11/2004 | Barbeau | ................. | F21V 23/04 |
| | | | | 320/107 |
| 7,400,112 B2 | 7/2008 | Barbeau et al. | | |
| 7,744,389 B1* | 6/2010 | Morris | ................. | H01R 31/065 |
| | | | | 439/151 |
| 8,878,485 B2* | 11/2014 | Fournier | ............... | H02J 7/0021 |
| | | | | 320/107 |
| 9,124,308 B2* | 9/2015 | Metcalf | ................. | H04B 5/0075 |
| 10,879,711 B2 | 12/2020 | Lollo et al. | | |
| 2004/0195767 A1* | 10/2004 | Randall | ............... | A63F 3/00643 |
| | | | | 273/237 |
| 2005/0194930 A1* | 9/2005 | Barbeau | ................. | F21S 9/022 |
| | | | | 320/116 |
| 2007/0223217 A1* | 9/2007 | Hsu | ........................... | F21S 9/02 |
| | | | | 362/183 |
| 2007/0291488 A1* | 12/2007 | Heathcock | ............ | H05B 47/19 |
| | | | | 362/276 |
| 2008/0144310 A1 | 6/2008 | Barbeau et al. | | |
| 2008/0151559 A1* | 6/2008 | Chen | ................... | F21V 21/0965 |
| | | | | 362/368 |
| 2008/0258679 A1* | 10/2008 | Manico | ................. | H02J 7/0042 |
| | | | | 320/106 |
| 2009/0033280 A1* | 2/2009 | Choi | ...................... | H02J 7/0029 |
| | | | | 320/108 |
| 2009/0067165 A1* | 3/2009 | Sanoner | ................ | F21V 21/096 |
| | | | | 362/191 |
| 2009/0072782 A1* | 3/2009 | Randall | .................... | G06F 1/263 |
| | | | | 320/107 |
| 2009/0179501 A1* | 7/2009 | Randall | ................... | H01R 25/147 |
| | | | | 307/104 |
| 2009/0243396 A1* | 10/2009 | Randall | ............. | H01R 13/6675 |
| | | | | 307/104 |
| 2009/0298553 A1* | 12/2009 | Ungari | .............. | H04M 1/72412 |
| | | | | 455/573 |
| 2009/0303702 A1 | 12/2009 | Ellis et al. | | |
| 2010/0022285 A1* | 1/2010 | Randall | .............. | H01R 13/2421 |
| | | | | 455/573 |
| 2010/0290215 A1* | 11/2010 | Metcalf | .................. | A47B 21/00 |
| | | | | 362/127 |
| 2011/0012518 A1* | 1/2011 | Tarter | ........................ | F21L 2/00 |
| | | | | 315/160 |
| 2011/0057603 A1* | 3/2011 | Marty | ................... | H02J 7/0069 |
| | | | | 320/106 |
| 2011/0133691 A1* | 6/2011 | Hautanen | ........... | H02J 7/00047 |
| | | | | 320/108 |
| 2013/0148342 A1 | 6/2013 | Yang | | |
| 2013/0257170 A1* | 10/2013 | Winget | ................ | H05K 5/0056 |
| | | | | 307/104 |
| 2014/0042962 A1* | 2/2014 | Thompson | .............. | H02J 7/025 |
| | | | | 320/107 |
| 2014/0126187 A1* | 5/2014 | Bennett | ..................... | F21L 2/00 |
| | | | | 362/183 |
| 2014/0203757 A1* | 7/2014 | Ibragimova | ............. | H02J 7/342 |
| | | | | 320/103 |
| 2014/0313706 A1* | 10/2014 | Itoh | .......................... | F21S 9/02 |
| | | | | 362/184 |
| 2015/0008870 A1* | 1/2015 | Lau | ....................... | H02J 7/0042 |
| | | | | 320/107 |
| 2015/0055330 A1* | 2/2015 | Xu | ............................ | F21S 2/00 |
| | | | | 362/183 |
| 2015/0155728 A1* | 6/2015 | Feustel | ................ | F21V 14/065 |
| | | | | 362/183 |
| 2015/0303736 A1* | 10/2015 | Eckerson | ................ | H02J 7/025 |
| | | | | 320/108 |
| 2016/0018091 A1* | 1/2016 | Markley | ................ | F21S 6/002 |
| | | | | 362/183 |
| 2016/0105047 A1 | 4/2016 | Cui | | |
| 2017/0038020 A1 | 2/2017 | Patton et al. | | |
| 2018/0166898 A1* | 6/2018 | Schreiber | .............. | H02J 7/0013 |
| 2018/0289189 A1* | 10/2018 | Lazzi | .................... | H02J 7/025 |
| 2018/0359877 A1* | 12/2018 | Wang | ................ | H01M 10/6556 |
| 2019/0123576 A1* | 4/2019 | Longo | .................... | F21V 23/04 |
| 2019/0154214 A1* | 5/2019 | Selevan | ..................... | B65D 25/20 |
| 2019/0239682 A1* | 8/2019 | Lee | ...................... | A47J 36/2472 |
| 2020/0067331 A1* | 2/2020 | McMurry | ............... | F21S 6/001 |
| 2020/0177006 A1* | 6/2020 | Lollo | .................... | H02J 7/0042 |

OTHER PUBLICATIONS

European Search Report, dated Oct. 29, 2021, from corresponding European Patent Application No. 19761538.8.

* cited by examiner

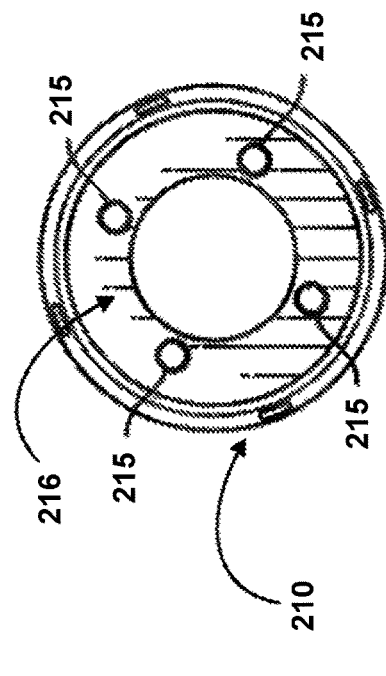
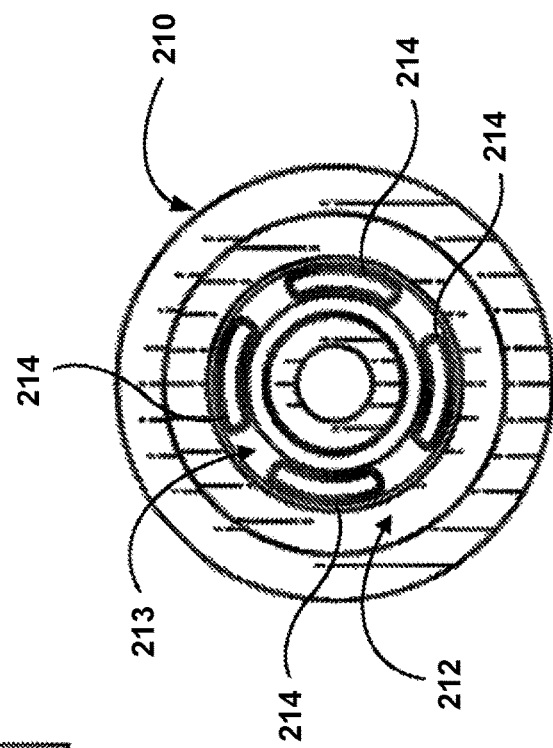
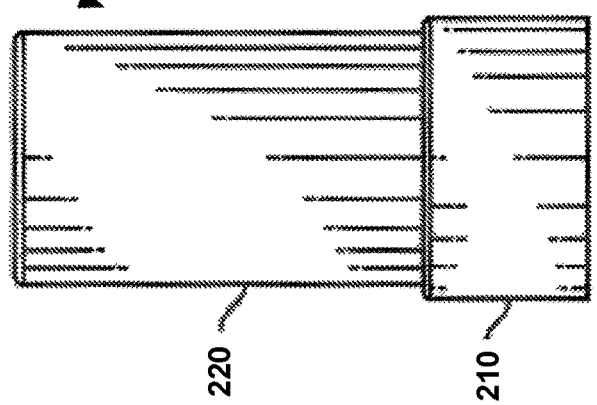
FIG. 2C
FIG. 2B
FIG. 2A

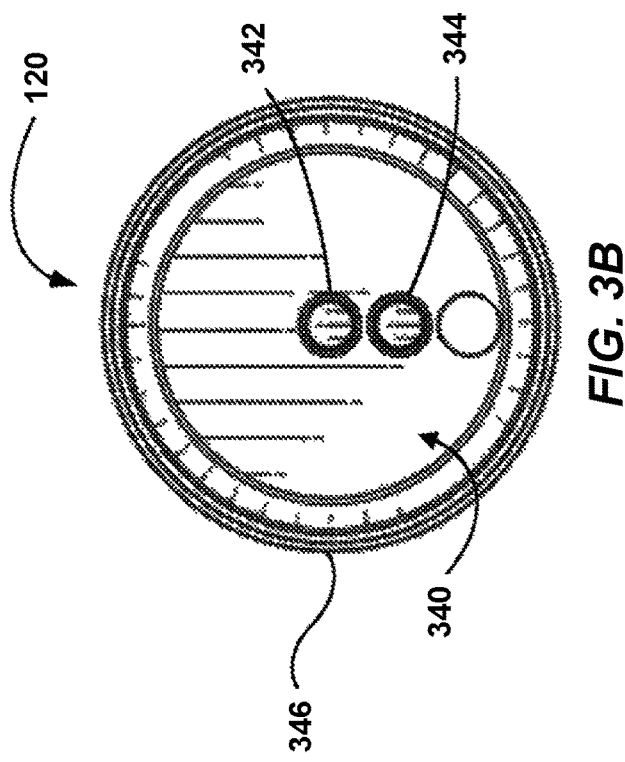
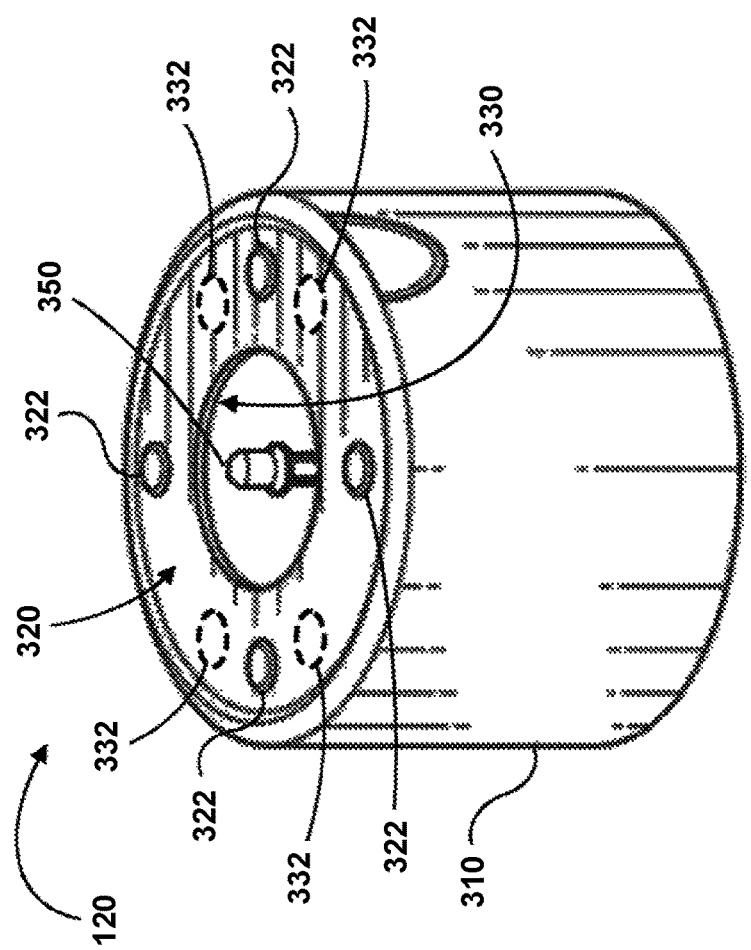
FIG. 3B
FIG. 3A

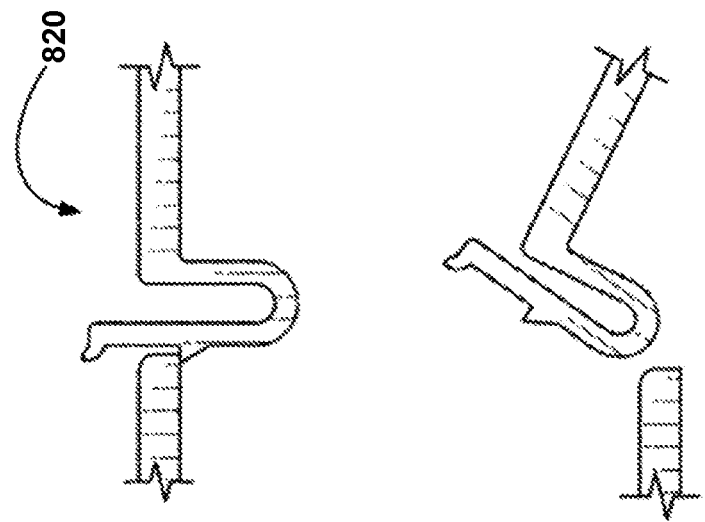
FIG. 8B
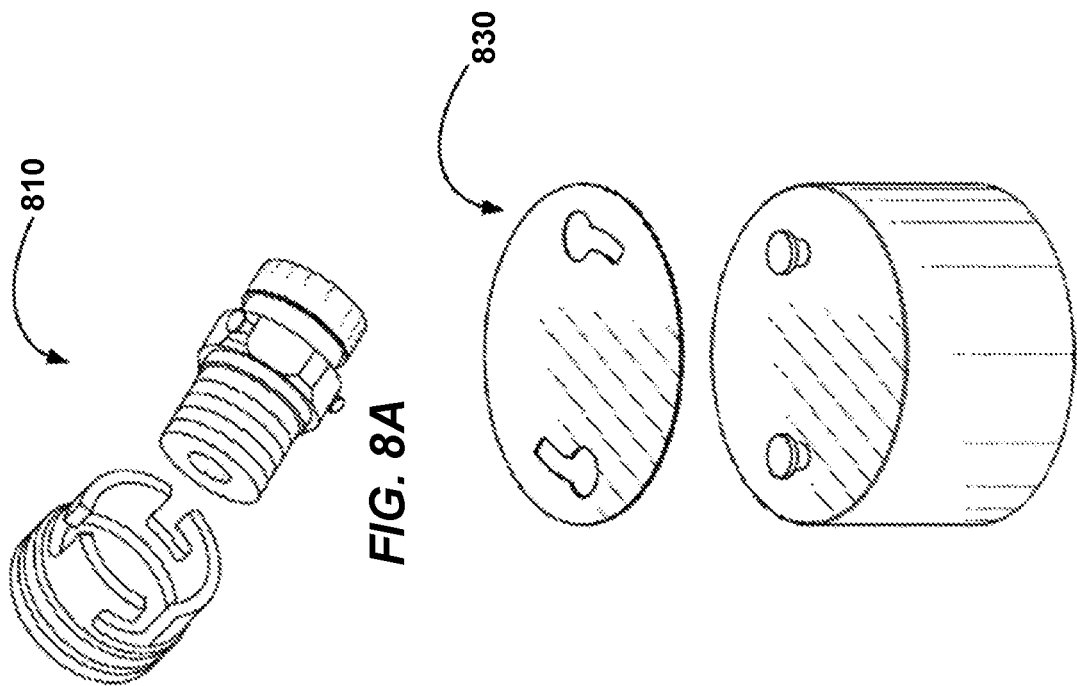
FIG. 8A
FIG. 8C

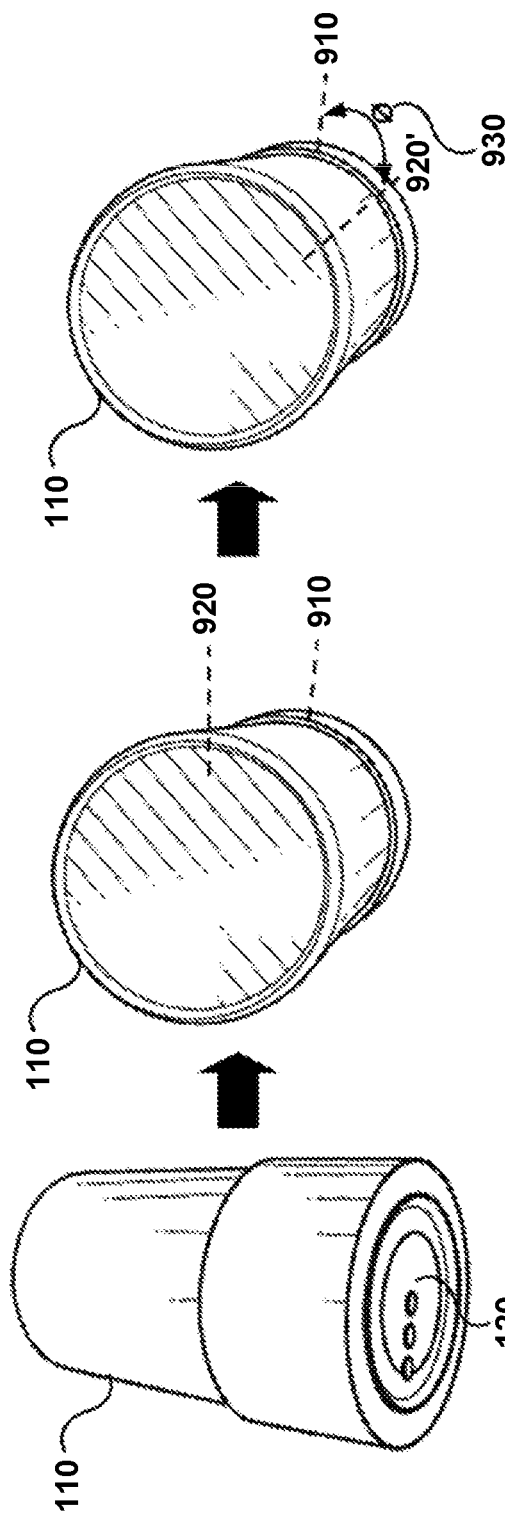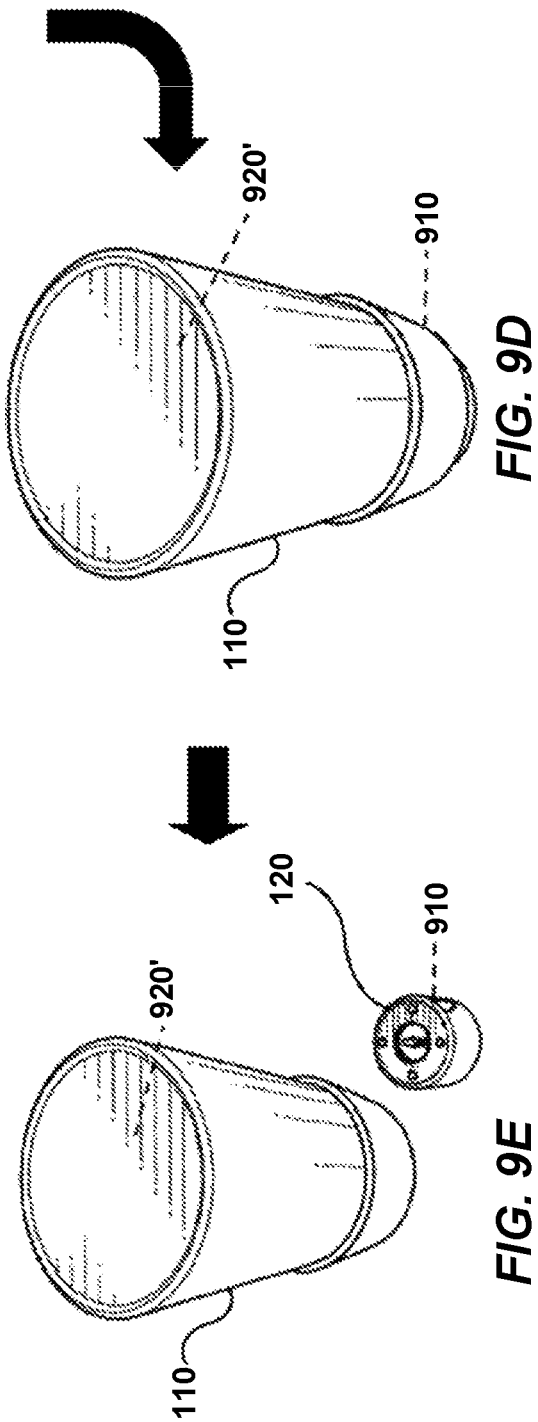

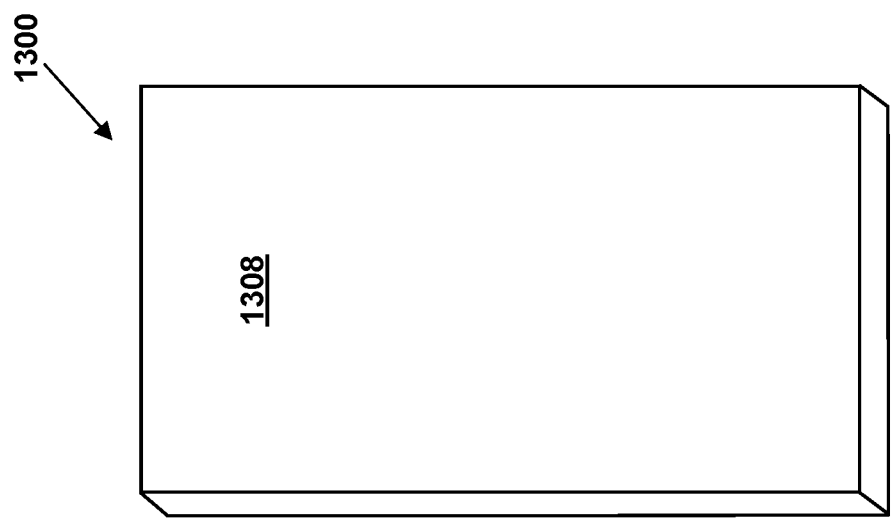

ELECTRIC LIGHTING SYSTEM AND COMPONENTS, AND CHARGING AND CONNECTION MECHANISMS THEREOF

CROSS-REFERENCE TO RELATED APPLICATIONS

This application is a continuation-in-part of U.S. patent application Ser. No. 16/967,575, filed Aug. 5, 2020, which is a national stage application filed under 35 U.S.C. § 371, of International Patent Application No. PCT/US2019/019914, filed on 27 Feb. 2019, which claims priority and a benefit under 35 U.S.C. § 119(e) of U.S. Provisional Patent Application 62/635,606, filed 27 Feb. 2018 the disclosures of which are hereby incorporated by reference.

TECHNICAL FIELD

Aspects of the present disclosure relate to lighting instrumentality and, more particularly, to electric lighting systems and charging and connection mechanisms thereof.

BACKGROUND

A candle or other flame-based light source may create a fire risk and otherwise cause harm or annoyance through the creation of smoke, heat, and residue. An electric lighting system may provide light without these detrimental effects. Portable and rechargeable electric lighting systems may provide additional benefits to a user by, for example, mimicking the portability of a candlelight source. But effectuating recharging in such systems may be cumbersome and time consuming, thus limiting the ability to enjoy the electric lighting system. In addition, assembling and disassembling the various components of such systems may be difficult, or non-intuitive, and the connection mechanisms may be unsightly.

SUMMARY

Example embodiments of the disclosed technology include an electric lighting system having a light source holder, one or more electric lights (also referred to herein as electric light sources), and a charger (also referred to herein as a charging platform or platform charger). Any aspects described herein of an electric light source may also be true of a power device. A power device is operable to receive charge and provide electronic power to other components and may or may not include an electric light source. In any of the embodiments disclosed herein, the electric light source may be insertable into a bottom cavity of the light source holder, and the position of the electric light source within the light source holder may be maintained with one or more magnets disposed in the electric light source and the light source holder. In any of the embodiments disclosed herein, twisting the electric light source relative to the light source holder within the bottom cavity may separate the one or more magnets, releasing the electric light source from within the light source holder.

In any of the embodiments disclosed herein, the charger may be a platform charger. The electric light source may be charged by placing the electric light source on the platform charger. One or more magnets in either or both of the electric light source and the charger may draw a charging pin from within the platform charger to a charging contact of the electric light source.

In any of the embodiments disclosed herein, an electric lighting system may have a plurality of electric light sources. The electric light sources, which are compatible with the light source holder, may be swappable. For example, a first electric light source may be charging, for example, in a utility room, while a second electric light source is assembled with the light source holder and placed, for example, on a table in a dining room. Later, the first and second electric light sources may be swapped so that the first electric light source is paired with the light source holder, and the second electric light source is connected to the charger and charging. In any of the embodiments disclosed herein, the various electric light sources may have different visual features, such as color or lighting mode (e.g., candle mimicry, flashing, etc.), and a particular electric light source may be selected to be connected with the light source holder based on a desired visual feature.

In any of the embodiments disclosed herein, an electric lighting system may have a plurality of light source holders. The light source holders may be swappable with the electric light source. For example, the electric light source may be inserted within a cavity of any one of the plurality of light source holders at a time. The light source holders may vary based on some visual feature, for example, having various geometry, opaqueness, colors, or light-hole patterns, and may be selected to be connected with the electric light source based on a desired visual effect.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE FIGURES

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIGS. 2A-2C illustrate various perspective views of a light source holder according to an example embodiment;

FIGS. 3A and 3B illustrate various perspective views of an electric light source according to an example embodiment;

FIGS. 8A-8C illustrate connection mechanisms for connecting an electric light source with a light source holder according to one or more example embodiments;

FIGS. 9A-9E illustrate disconnection of an electric light source from a light source holder according to an example embodiment;

FIGS. 13A and 13B are schematic diagrams of a group charging station in accordance with some example embodiments;

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Example embodiments of the disclosed technology include an electric lighting system having a light source holder, one or more electric lights (also referred to herein as electric light sources), and a charger (also referred to herein as a charging platform or platform charger). In any of the embodiments disclosed herein, the electric light source may be insertable into a bottom cavity of the light source holder, and the position of the electric light source within the light source holder may be maintained with one or more magnets disposed in the electric light source and the light source holder. In any of the embodiments disclosed herein, twisting the electric light source relative to the light source holder within the bottom cavity may separate the one or more magnets, releasing the electric light source from within the light source holder.

Some example embodiments of the disclosed technology will be described more fully hereinafter with reference to the accompanying drawings. One of ordinary skill will understand that the disclosed technology might be embodied in many different forms and should not be construed as limited to the example embodiments set forth herein.

Figure 1:
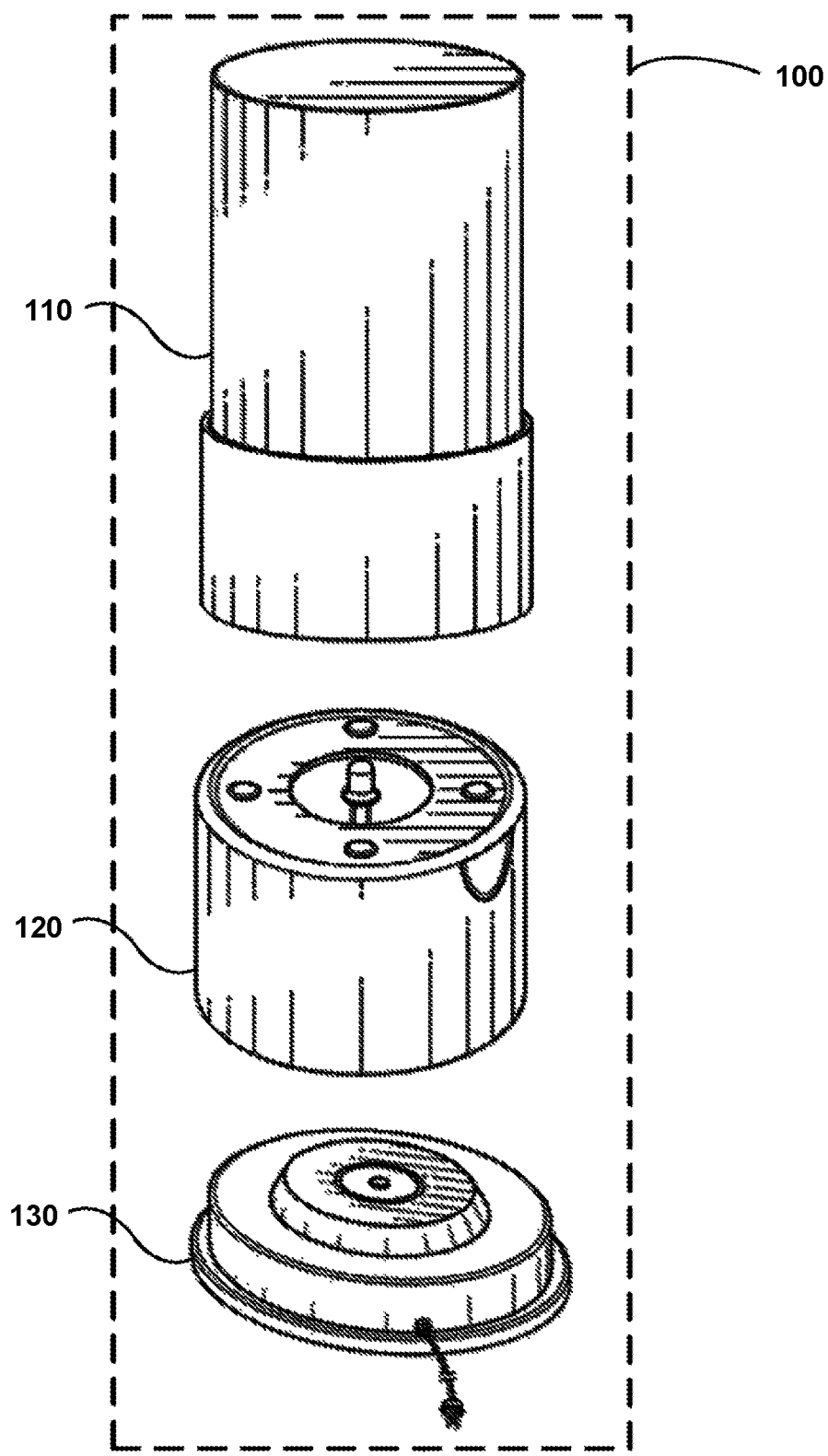
FIG. 1 is a perspective view of a disassembled electric lighting system according to an example embodiment.
Figure 5:
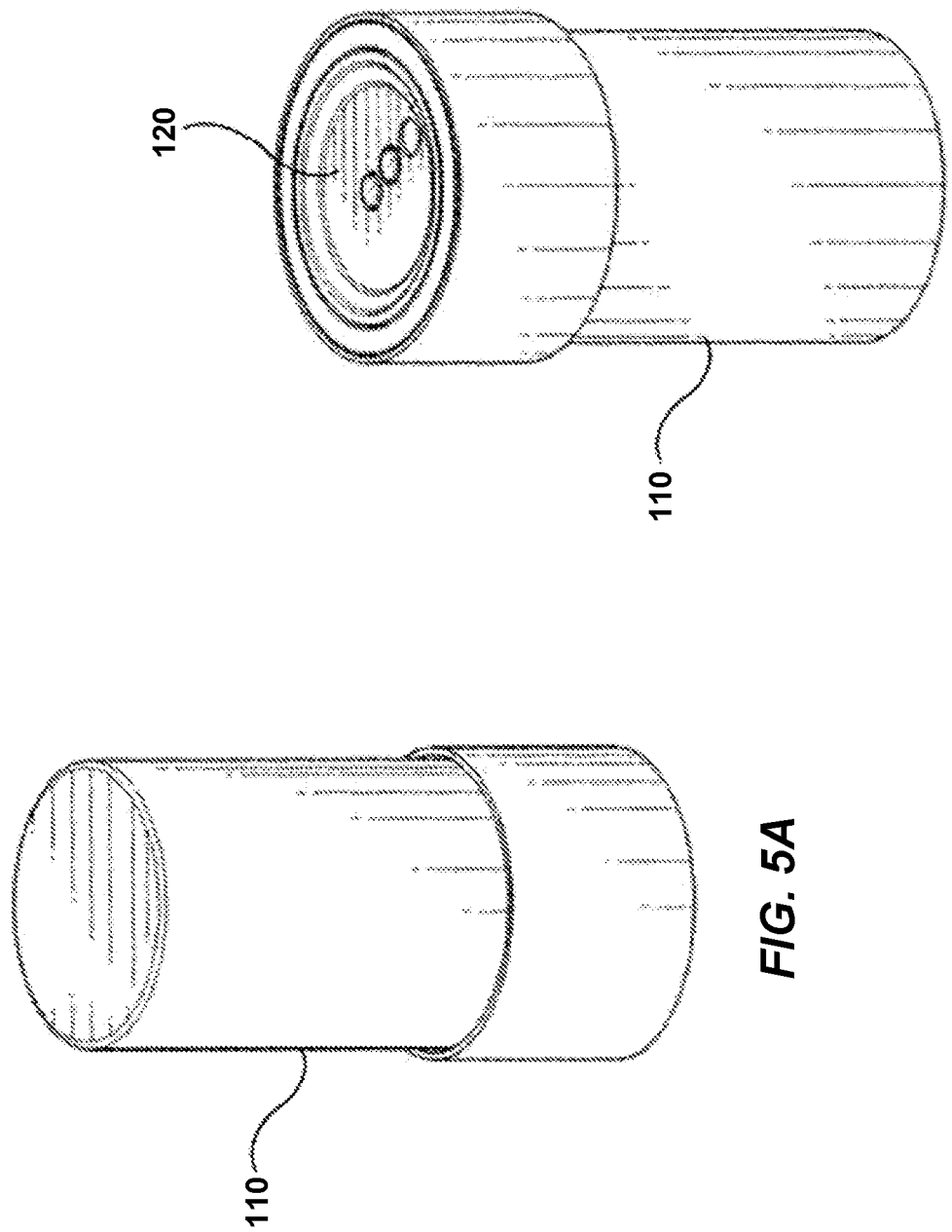
FIGS. 5A and 5B illustrate various perspective views of an electric light source assembled with a light source holder according to an example embodiment.

Referring now to the drawings, FIG. 1 illustrates a disassembled electric lighting system according to an example embodiment. In any of the embodiments disclosed herein, the electric lighting system 100 includes a light source holder 110, one or more electric light sources 120, and a charger 130. The light source holder 110 may be combinable, or removably couplable, with the one or more electric light sources 120. In any of the embodiments disclosed herein, when the electric light source 120 is removably coupled to the light source holder 110, the electric light source 120 and the light source holder 110 share a central axis. The electric light sources 120 may emit light, and the emitted light may be disbursed by the light source holder 110 when the electric light source 120 is connected to the light source holder 110 (as described below with reference to FIG. 5 in more detail). The charger 130 may charge batteries (not shown) disposed in the respective electric light sources 120 and may be configured for electrical communication with a power source. In any of the embodiments disclosed herein, the charger 130 may include a power cord connectable to a power source. In any of the embodiments disclosed herein, the charger 130 may be a platform charger (as depicted herein), a traditional plugin type charge, or any other charging station that can transmit electrical power from a source to an electric light source 120.

The electric lighting system 100 may include a plurality of electric light sources 120. The electric light sources 120 may be swappable within the light source holder 110 (e.g., each of the electric light sources 120 may be assembled with the light source holder 110, or disassembled with the light source holder 110 and replaced by another electric light source 120). Batteries within the electric light sources 120 may be individually charged by the charger 130. In any of the embodiments disclosed herein, one electric light source 120 may be charged by the charger 130, while another electric light source 120 is assembled with the light source holder 110 and disposed remote from the charger 130. Though not shown, it is contemplated that in any of the embodiments disclosed herein, the light source holder 110 and the electric light source 120 may be integrated, such that they are not readily detachable.

Various features of the electric lighting system 100 and its components will be discussed in greater detail below with reference to FIGS. 2A-12.

FIGS. 2A-2C illustrate a light source holder according to an example embodiment. The light source holder 110 includes a base 210 and a chimney 220. The base may be substantially hollow and may be configured to receive an electric light source 120. The chimney 220 may be configured to disperse light emitted from a connected electric light source 120.

The base 210 may include a cavity 212 configured and sized to receive an electric light source 120. The cavity 212 may have similar geometry (e.g., size and shape) to the electric light source 120. In any of the embodiments disclosed herein, the cavity 212 may have a greater size than the electric light source 120 to enable a clearance fit between the two. In any of the embodiments disclosed herein, the cavity 212 may be substantially cylindrical, and the electric light source 120 may be able to rotate therein. In any of the embodiments disclosed herein, when the electric light source 120 is removably coupled to the light source holder 110 inside the cavity 212, the electric light source and the light source holder share a central axis.

The cavity 212 may include an attachment surface 213 for making maintaining a mechanical connection with an electric light source 120. The attachment surface 213 that contacts the electric light source 120 may include one or more grooves 214. The grooves 214 may be disposed thereon the attachment surface 213 and may serve to guide movement of the electric light source 120 (as will be discussed below in greater detail with reference to FIGS. 3 and 5). In any of the embodiments disclosed herein, the grooves 214 may be configured along a substantially circular path. For example, in any of the embodiments disclosed herein, the one or more grooves 214 may be positioned between inner and outer perimeters of the attachment surface 213 and/or any other position relative to positioning members of the electric light source 120.

In any of the embodiments disclosed herein, one or more magnets 215 may be used as an attachment mechanism for maintaining a connection with the electric light source 120. The base 210 may further comprise a light source surface 216. For example, in any of the embodiments disclosed herein, the light source surface 216 may be opposite the attachment surface 213. In any of the embodiments disclosed herein, the one or more magnets 215 may be disposed on the light source surface 216. The one or more magnets 215 may be positioned between inner and outer perimeters of the light source surface 216. Further, the one or more magnets 215 may be positioned relative the one or more grooves 214. For example, in any of the embodiments disclosed herein, the one or more magnets 215 may be positioned relative an end of one or more grooves 214, in the middle of the one or more grooves 214 such that a portion of a groove 214 is magnetized and a portion is non-magnetized, or any other suitable position on the light source surface 216 of the base 210.

The attachment surface 213 may include a hole configured to allow light emitted from the electric light source 120 to pass therethrough. In any of the embodiments disclosed herein, the hole may be covered with a cover (e.g., cover 610 discussed further herein). In any of the embodiments disclosed herein, the cover 610 may comprise a transparent or translucent material. In any of the embodiments disclosed herein, the chimney 220 can be made of a transparent material, such as, as non-limiting examples, clear glass or plastic. In any of the embodiments disclosed herein, the chimney 220 may be made of a translucent material, such as frosted glass or translucent plastic. In any of the embodiments disclosed herein, the chimney 220 may be made of an opaque material, such as metal or silvered glass. In any of the embodiments disclosed herein, the chimney 220 may be colored and translucent.

In any of the embodiments disclosed herein, the chimney 220 may be incorporated into the base 210. For example, in any of the embodiments disclosed herein, the chimney 220 may be detachably connected to the base 210. In any of the embodiments disclosed herein, light source holder 110 may not include a chimney 220. Further, in any of the embodiments disclosed herein, the chimney 220 can be cylindrical, though in some embodiments, the chimney 105 may take on other three-dimensional shapes such as a sphere, cuboid, triangular prism, or other shape as desired.

FIGS. 3A and 3B illustrate an electric light source according to an example embodiment. The electric light source 120 may include a body 310 housing a battery (not pictured) and a lighting element 350. In any of the embodiments disclosed herein, the electric light source 120 may be substantially cylindrical. A top surface 320 of the electric light source 120 may be sized to be received by the cavity 212 and configured to attach to the attachment surface 213 of the light source holder 110. The top surface 320 may include one or more guides 322 disposed thereon. The one or more guides 322 may be positioned between inner and outer perimeters of the top surface 320. The guides 322 may be configured to interact with the grooves 214 disposed on the attachment surface 213 of the light source holder 110. Further, the one or more guides 320 may be positioned relative the one or more grooves 214. The guides 322 may be made of a material to enable smooth gliding between attachment surface 213 of the light source holder 110 and the top surface 320.

One or more magnets 332 may be disposed proximate to (e.g., disposed on, or integrated with) the top surface 320. Further, one or more magnets 332 may be disposed proximate to (e.g., disposed on, or integrated with) an underside 330 of the top surface 320. In any of the embodiments disclosed herein, the magnets 332 may be disposed proximate to the guides 322. The one or more magnets 332 may be arranged to match with the one or more respective magnets 215 of the light source holder 110 in order to maintain a connection between the light source holder 110 and the electric light source 120. For example, in any of the disclosed embodiments, the at least one magnet 332 of the electric light source 120 and the at least one magnet 215 of the base 210 may have opposite magnetic polarities. Further, for example, when the top surface 320 of the electric light source 120 is brought proximate the attachment surface 213 of the cavity 212, a magnetic attraction force between the at least one magnet 332 of the electric light source 120 and the at least one magnet 215 of the base 210 may cause the base 210 to rotate relative to the electric light source 120 and/or may cause the electric light source 120 to rotate relative to the base 210.

A bottom surface 340 of the electric light source 120 may be configured to connect with the charger 130. A first and second electric contact 342 and 344 may be disposed on the bottom surface 340. At least one of the first or second electric contacts 342 and 344 may be magnetized. Accordingly, when the electric light source 120 is disposed on the charger 130, the magnetized electric contact 342 or 344 may draw a charging pin of the charger 130 to make electrical contact with the charging pin. The bottom surface 340 may further include a static friction element 346. The static friction element 346 may be configured to resist movement of the bottom surface 340 when contacting another surface (e.g., a table top). For example, in any of the embodiments of the embodiments disclosed herein, when a rotational force sufficient to overcome the magnetic attraction force between the at least one magnet 332 of the electric light source 120 and the at least one magnet 215 of the base 210 is applied to the light source holder 110, static friction between the static friction element 346 and a supporting surface impedes rotation of the electric light source 120 relative to the supporting surface such that the light source holder 110 can (i) rotate relative to the electric light source 120 and (ii) be uncoupled from the electric light source 120. In any of the embodiments disclosed herein, the static friction element 346 may include rubber, a rubberized component, or any other suitable material.

The electric light source 120 includes a lighting element 305. The lighting element 305 may include one or more lighting elements 305 (e.g., light-emitting diodes (LEDs)). In any of the embodiments disclosed herein, the lighting element 305 may include a single LED board with an array of LEDs. The LEDs may be organized in different configurations or grouped into channels. In any of the embodiments disclosed herein, the lighting element 305 may be configured to generate a flickering light effect, for example, to mimic a flame, for example, as described in U.S. patent application Ser. No. 15/825,450, the entire disclosure of which is incorporated herein by reference as if set forth in full. The lighting element 305 may be similar to that described in U.S. patent application Ser. No. 15/825,450.

FIGS. 5A and 5B illustrate the electric light source 120 disposed within the light source holder 110. The electric light source 120 has substantially similar geometry as the cavity 212 of the light source holder 110. The bottom surface 340 of the electric light source 120 is substantially flush with a bottom of the light source holder 110. Light from the electric light of the electric light source 120 may be emitted through the hole formed in the attachment surface 213 of the light source holder 110.

To connect the light source 120 to the light source holder 110, the light source 120 may be inserted into the cavity 212, or the cavity 212 of the light source holder 110 may be placed around the electric light source 120. The magnets 215 of the light source holder 110 and the magnets 332 disposed underside 330 of the top surface 320 may orient the electric light source 120 within the light source holder 110 (e.g., rotate the electric light source 120 and/or the light source holder 110 so that the magnets 254 and 332 are disposed relatively close to each other, or generate a force in the rotation direction). The magnetic force of the magnets 215 and 332 may maintain the light source 120 within the cavity 212 of the light source holder 110.

To disconnect the light source 120 from the light source holder, the magnets 215 and 332 must be separated. In any of the embodiments disclosed herein, the magnets 215 and 332 and guides 322 may be disposed such that the guides 322 are positioned at one end of a respective groove 214 when the magnets 215 and 332 are in maximal orientation (i.e., when the electric light source 120 is most secured within the light source holder 110). In any of the embodiments disclosed herein, the electric light source 120 may be rotated relative to the light source holder 110 to separate the magnets 215 and 321 (i.e., rotated such that the guides 322 move along the grooves 214). When the rotation moves the guides 322 to an opposite end of the grooves 214 from the maximal orientation, the guides 322 and grooves 214 may serve as a stopper to the rotation. At this point, the magnets 215 and 332 may be sufficiently separated such that the magnetic attraction does not impede removal of the electric light source 120 from the light source holder 110. For example, in any of the embodiments disclosed herein, the force of gravity may overcome the magnetic attraction at this position.

However, this is merely an example, and, in any of the embodiments disclosed herein, the magnets 215 and 332 and guides 322 may be disposed such that the guides 322 are positioned at a middle area of a respective groove 214 when the magnets 215 and 332 are in maximal orientation. In this case, the light source holder 110 and the electric light source 120 may be relatively rotated in either direction to separate magnets 215 and 332 such that the magnetic attraction does not impede removal of the electric light source 120 from the light source holder 110. When the rotation moves the guides 322 to either end of the grooves 214, the guides 322 and grooves 214 may serve as a stopper to the rotation, and the electric light source 120 may be released from the connection with the light source holder 110.

In any of the embodiments disclosed herein, the rotation may be achieved by a user applying downward pressure to the light source holder 110 and rotating the light source holder 110. The static friction element 346 disposed on the bottom surface 340 of the electric light source 120 may provide resistance to the rotation of the light source holder 110 via friction against a resting surface (e.g., a table, hand, or shelf) such that the light source holder 110 rotates while the electric light source 120 disposed within the cavity 212 is relatively static. For example, FIGS. 9A-9E illustrate disconnection of an electric light source 120 from a light source holder 110 according to an example embodiment. In FIG. 9A, the electric light source 120 is held securely within the cavity of a light source holder 110 by the magnets 215 and 332. In FIG. 9B, the light source holder 110 is placed on a surface such that the light source holder 110 is oriented along axis 920 and the electric light source 120, located inside the light source holder 110, is oriented along axis 920. In FIG. 9C, a downward and clockwise force is applied to the light source holder 110 causing the light source holder 110 to be rotated clockwise by some degree 930 from axis 920 to axis 920', thus reducing the attractive force applied by magnets 215 and 332. Due to the static friction element 346, the electric light source 120 does not move with the light source holder 110. In FIG. 9D, the light source holder 110 may then be lifted up causing the light source holder 110 to separate from the electric light source, as depicted in FIG. 9E.

Figure 4:
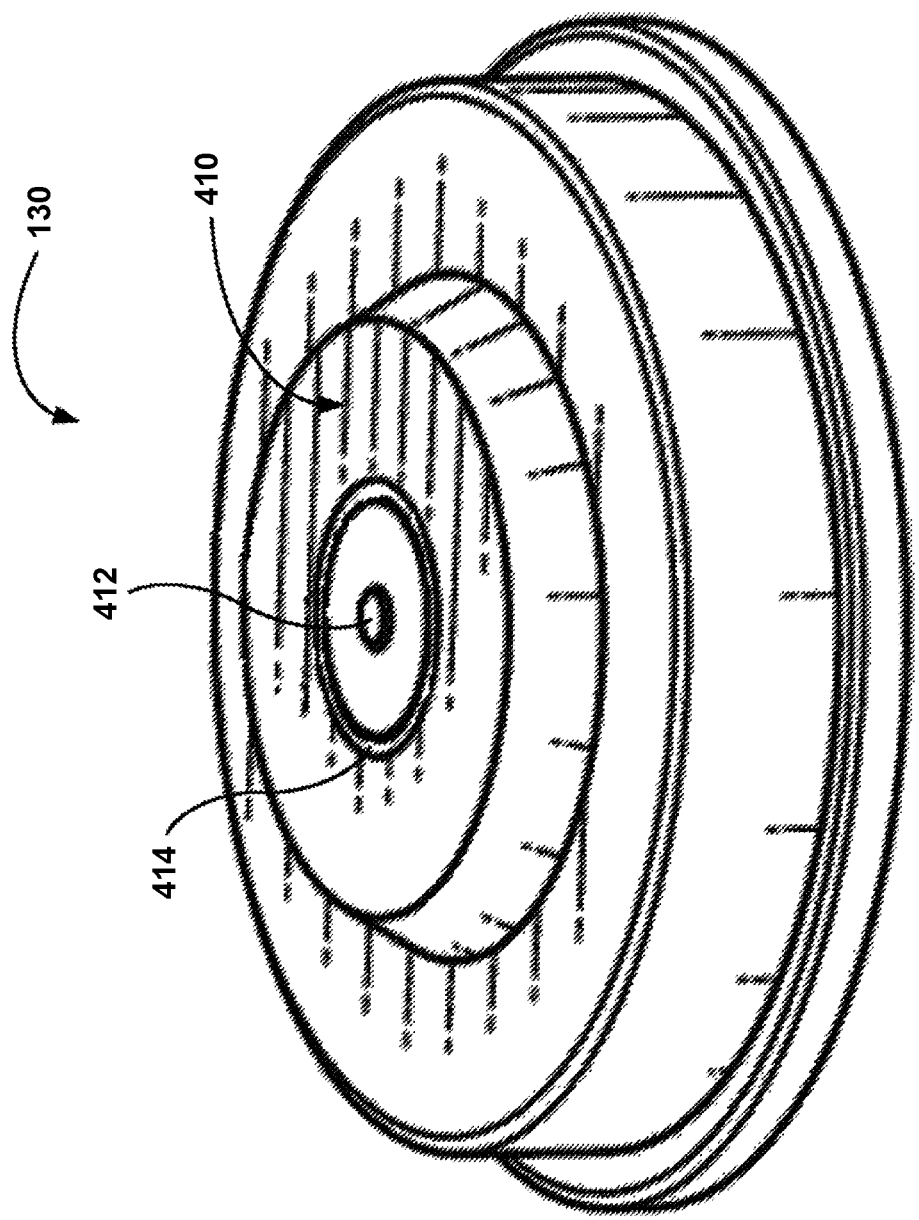
FIG. 4 illustrates a charging platform according to an example embodiment.
Figure 6:
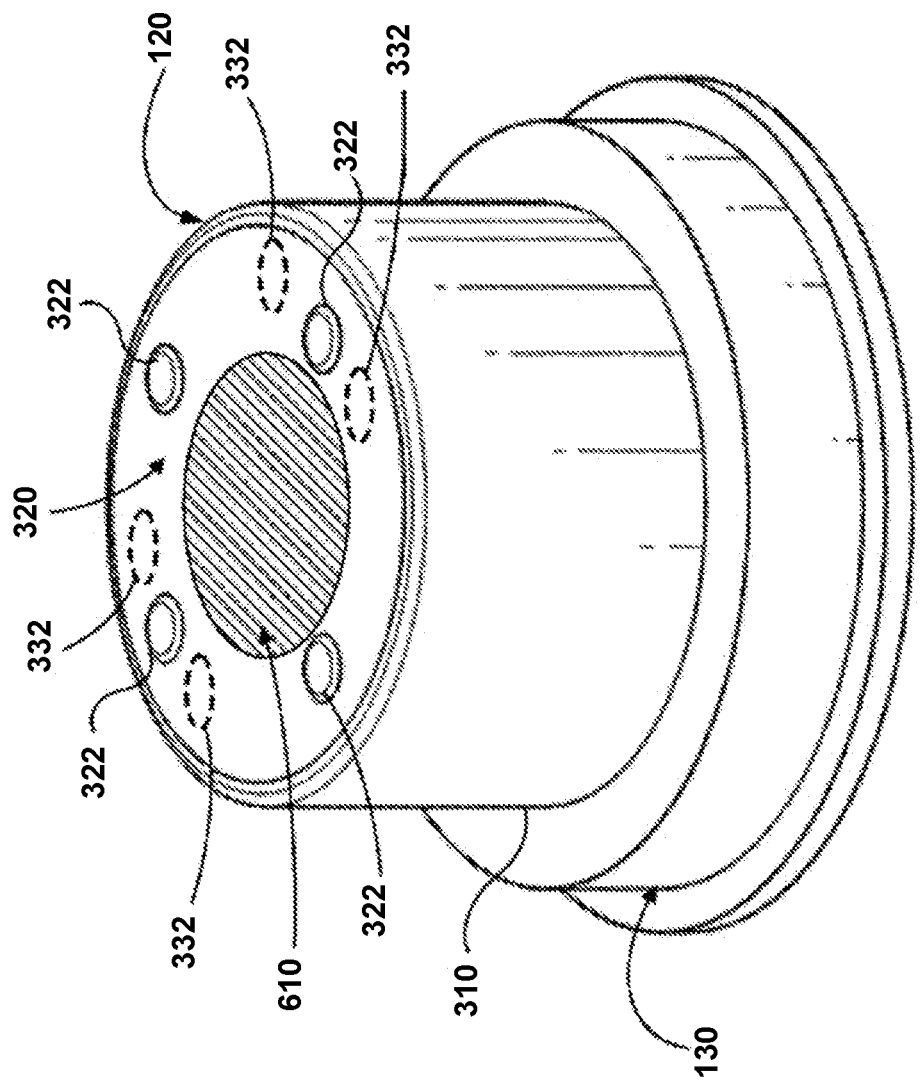
FIG. 6 illustrates an electric light source charging on a charging platform according to an example embodiment.

Referring now to FIG. 4, a charger is shown according to an example embodiment. The illustrated charger 130 is a platform charger 130. One of ordinary skill will understand that the platform charger 130 illustrated in FIG. 4 is merely a non-limiting example, and the charger 130 may be of various types and configurations. The platform charger 130 may be configured to charge the electric light source 120 when supporting the bottom surface 340 of the electric light source 120 with its upper surface 410, for example, as illustrated in FIG. 6. A first and second charging contact 412 and 414 may be disposed on the upper surface 410, and configured to match with the first and second electric contacts 342 and 344 of the electric light source 120. The first charging contact 412 may be a charging pin 412. The charging pin 412 may be positioned within the platform charger 130. The second charging contact 414 may be a charging ring 414. The charging ring 414 may be positioned within the platform charger 130. For example, in any of the embodiments disclosed herein, the charging pin 412 may be disposed proximate the center of the charging ring 414. In a case where the first electric contact 342 is magnetized, when the electric light source 120 is positioned on the platform charger 130, the magnetized first electric contact 342 may draw the charging pin 412 out of the platform charger 130 to contact the first electric contact 342, thereby completing an electric circuit.

Figure 7:
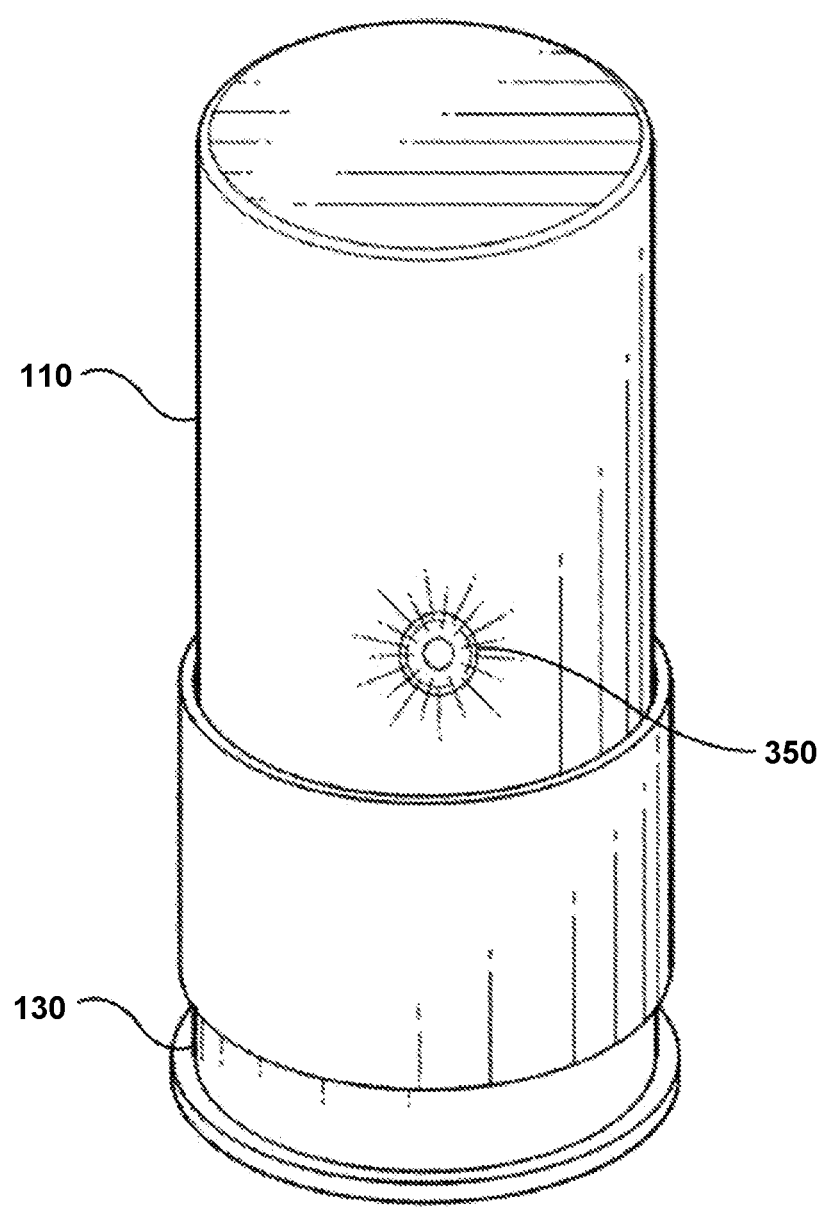
FIG. 7 illustrates an electric light source assembled with a light source holder charging on a charging platform according to an example embodiment.

The second charging contact 414 may be a coaxial contact 414 surrounding the charging pin 412. In this case, the platform charger 130 may charge the battery of the electric light source 120 in any rotational orientation. But this is merely an example and, in any of the embodiments disclosed herein, a particular orientation may be needed to effectuate charging. For example, in any of the embodiments disclosed herein, the charging pin 412 may configured to transition from a retracted position to an extended position, and the charging ring 414 may be in a fixed position. In any of the embodiments disclosed herein, the platform charger 130 may be configured to charge the electric light source 120 even while the electric light source 120 is assembled with an electric light holder 110, for example, as illustrated in FIG. 7. But this is merely an example and, in any of the embodiments disclosed herein, the platform charger 130 may not accommodate the electric light source 120 when it is disposed within the cavity 212 of the electric light holder 110.

FIGS. 8A-8C illustrate various connection mechanisms for connecting an electric light source 120 with a light source holder 110 according to any of the embodiments disclosed herein. In any of the embodiments disclosed herein, the illustrated connection mechanisms may be used instead of magnets 214 and 324. For example, in any of the embodiments disclosed herein, a turn and lock mechanism 810, snap and lock mechanism 820, and a slide and lock mechanism 830 may be incorporated into an electric light source 120 and a light source holder 110. But one of ordinary skill will understand that these are merely examples and, in any of the embodiments disclosed herein, alternative connection mechanisms (e.g., simple screw, etc.) may be used to connect an electric light source 120 and a light source holder 110.

Figure 10:
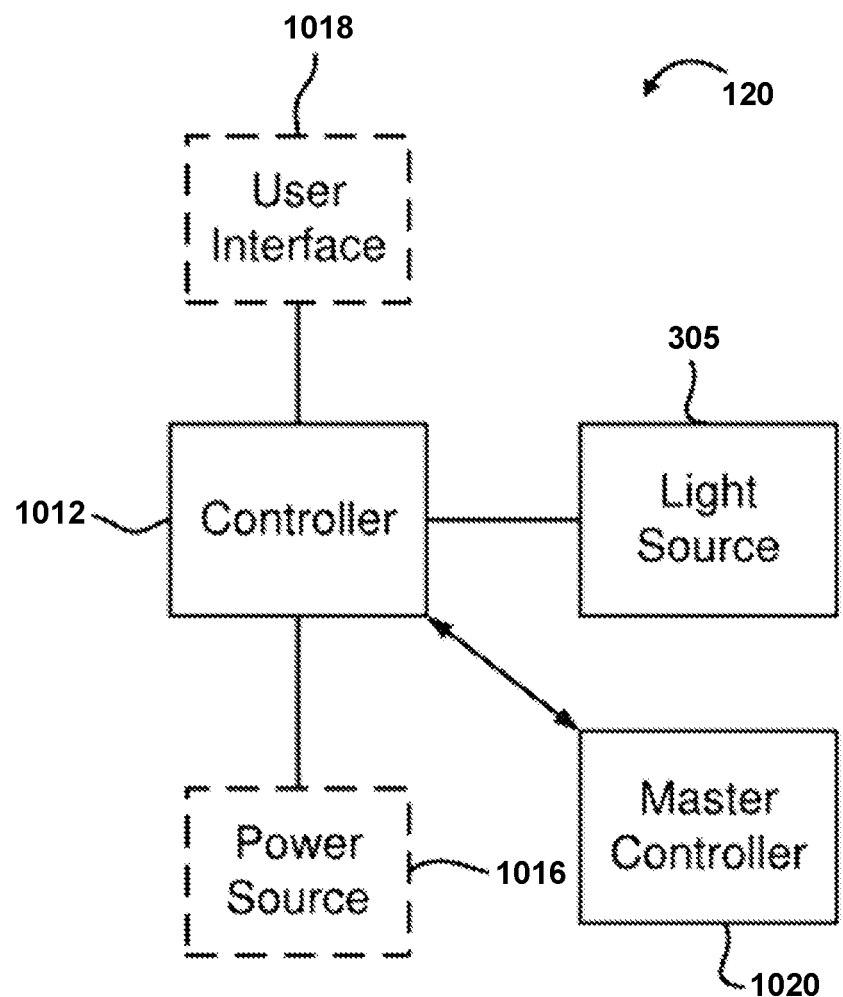
FIG. 10 is a block diagram of a base of a flameless candle according to an example embodiment.

FIG. 10 is a block diagram of an electric light source, or module, 120 according to an example embodiment. In any of the embodiments disclosed herein, the electric light source 120 includes a controller 1012, light source 305, a power source 1016 (e.g., a battery), a user interface 1018, and a master controller 1020.

In any of the embodiments disclosed herein, the controller 1012 may include a storage and a processor. In any of the embodiments disclosed herein, the controller 1012 may be a microcontroller or a microprocessor. The controller 1012 may be configured to control the light source 305. For example, the controller 1012 may be configured to control the light source 305 to produce a flickering light effect using a flickering method, for example, as discussed in U.S. application Ser. No. 15/825,450.

In any of the embodiments disclosed herein, the power source 1016 may be included within the electric light source 1020. For example, the power source 1016 may include one or more batteries disposed within the electric light source 1020. In any of the embodiments disclosed herein, the power source 1016 may be disposed separate from the electric light source 1020. In any of the embodiments disclosed herein, power may be supplied from an external power source 1016, such as a wall outlet. In further embodiments, power may be supplied through a hardwire connection to a power grid. The controller 1012 may control the light source 305 to produce a flickering light effect by controlling an amount of power provided to the light source 305, such power being received from the power source 1016.

As illustrated by FIG. 10, in any of the embodiments disclosed herein, the electric light source 120 may include a user interface 1018. The user interface 1018 can provide for user control of the electric light source 120. In any of the embodiments disclosed herein, the user interface 1018 may be used to select an on/off state of the electric light source 120. Further, the user interface 1018 may be used to select an on/off state of a flickering effect of the electric light source 120. Additionally, the user interface 1018 may be used to adjust and/or modify the flickering effect of the electric light source 120. The controller 1012 may control the light source 305 in accordance with a user interaction with the user interface 1018.

The master controller 1020 may command a specific setup of the electric light source 120. For example, the master controller 1020 may command a specific illumination level or flickering mode of the electric light source 120. In any of the embodiments disclosed herein, the master controller 1020 may be in communication with one or more controllers 1012 of the electric light source 120. In any of the embodiments disclosed herein, the master controller 1020 may send instructions to the controller 1012 to implement specific setups. Alternatively, in any of the embodiments disclosed herein, the master controller 1020 may be implemented within the controller 1012 (e.g., as software, hardware, or a combination of software and hardware).

In any of the embodiments disclosed herein, the master controller 1020 may be external to the electric light source 120. In any of the embodiments disclosed herein, the controller 1012 may be further configured to receive commands from an external master controller 1020. For example, the master controller 1020 may be implemented in a charging station (for example, group charging station 1100 discussed below with reference to FIGS. 11A-11C), and may communicate with the controller 1012 while the electric light source 120 is connected to the charging station. In any of the embodiments disclosed herein, the master controller 1020 may be configured to communicate wirelessly with the controller 1012 to control the electric light source 120. In such cases, the master controller 1020 may communicate with the controller 1012 through the user interface 1018 or the controller 1012 may include a wireless receiver. In any of the embodiments disclosed herein, the master controller 1020 may communicate with a plurality of electric light source 120 (e.g., controllers 1012 of different electric light sources 120) simultaneously or substantially simultaneously. Accordingly, the plurality of electric light source 120 may be commanded to a particular setup simultaneously using the master controller 1020. In any of the embodiments disclosed herein, master controller 1020, may be embedded in an electric light source 120, such that the electric light source 120 may communicate commands to one or more other electric light sources 120. As will be appreciated, such distributed communication can improve the communication efficiency of an electric lighting system 100.

Figure 11A:
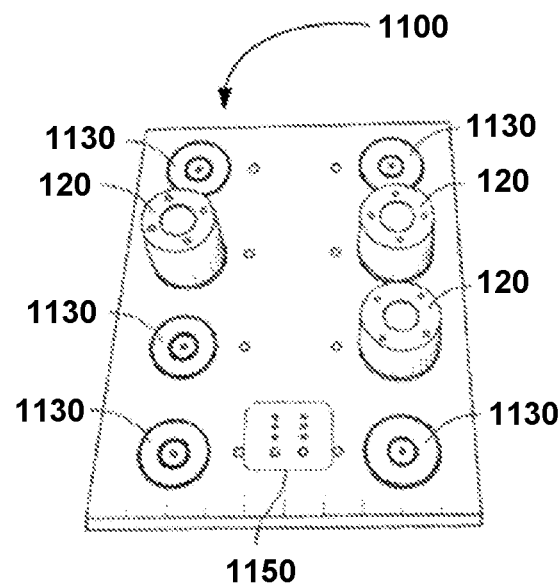
FIGS. 11A-11C illustrate a group charging platform according to an example embodiment.
Figure 11B:
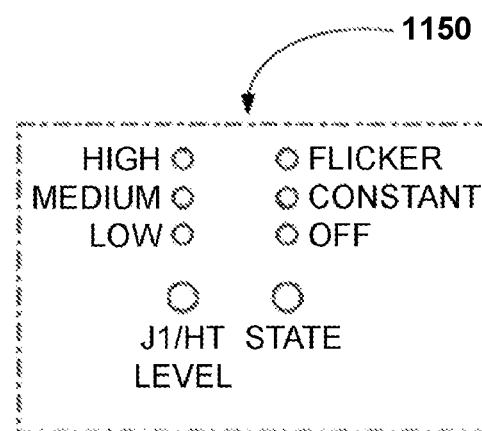
Figure 11C:
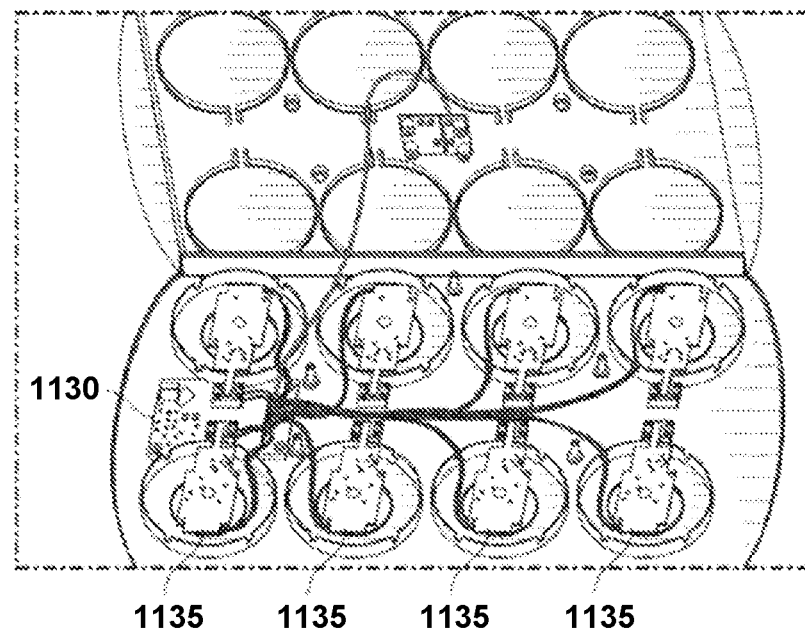

FIGS. 11A-11C illustrate a group charging station in accordance with an example embodiment. Group charging station 1100 may include a plurality of charging platforms 1130 and a control panel 1150. The control panel may be connected to a main charging board 1155, which may control a plurality of auxiliary charging boards 1135 connected to the charging platforms 1130. The charging platforms 1130 may be of various types and configurations. Each of the plurality of charging platforms 1130 may be configured to charge a respective electric light source 120 when supporting the bottom surface 330 of the electric light source 120. The charging platforms 1130 may be similar to the platform charger 130 described above with reference to FIG. 4.

The control panel 1150 may be configured to receive user input to adjust a state of one or more light sources 120 connected to the group charging station 1100. For example, the control panel may include inputs and indicators setting a brightness level of the light sources 120 low medium or high. In any of the embodiments disclosed herein, the control panel 1150 may also control a state of the one or more connected light sources 120, for example, between off, constant (e.g., steady light), and flicker (e.g., mimicking a flame). However, these are merely exemplary controls and one of ordinary skill will recognize that various additions or modifications may be made therein without departing from the present disclosure. The control panel interacts with the main control board 1155 may instruct the auxiliary charging boards 1135 based on instructions to the control panel 1150. Together, the main charging board 1155 and one or more auxiliary charging boards 1135 may make forma master controller 1020. In any of the embodiments disclosed herein, the main charging board 1155 and one or more auxiliary charging boards 1135 may control the electric light source 120 (e.g., control the controller 1012) through charging pins in the charging platforms 1130. One of ordinary skill will recognize that these are merely examples, and a group charging platform 1100 and master controller 1020 may take various forms as anticipated within the present disclosure.

Figure 12:
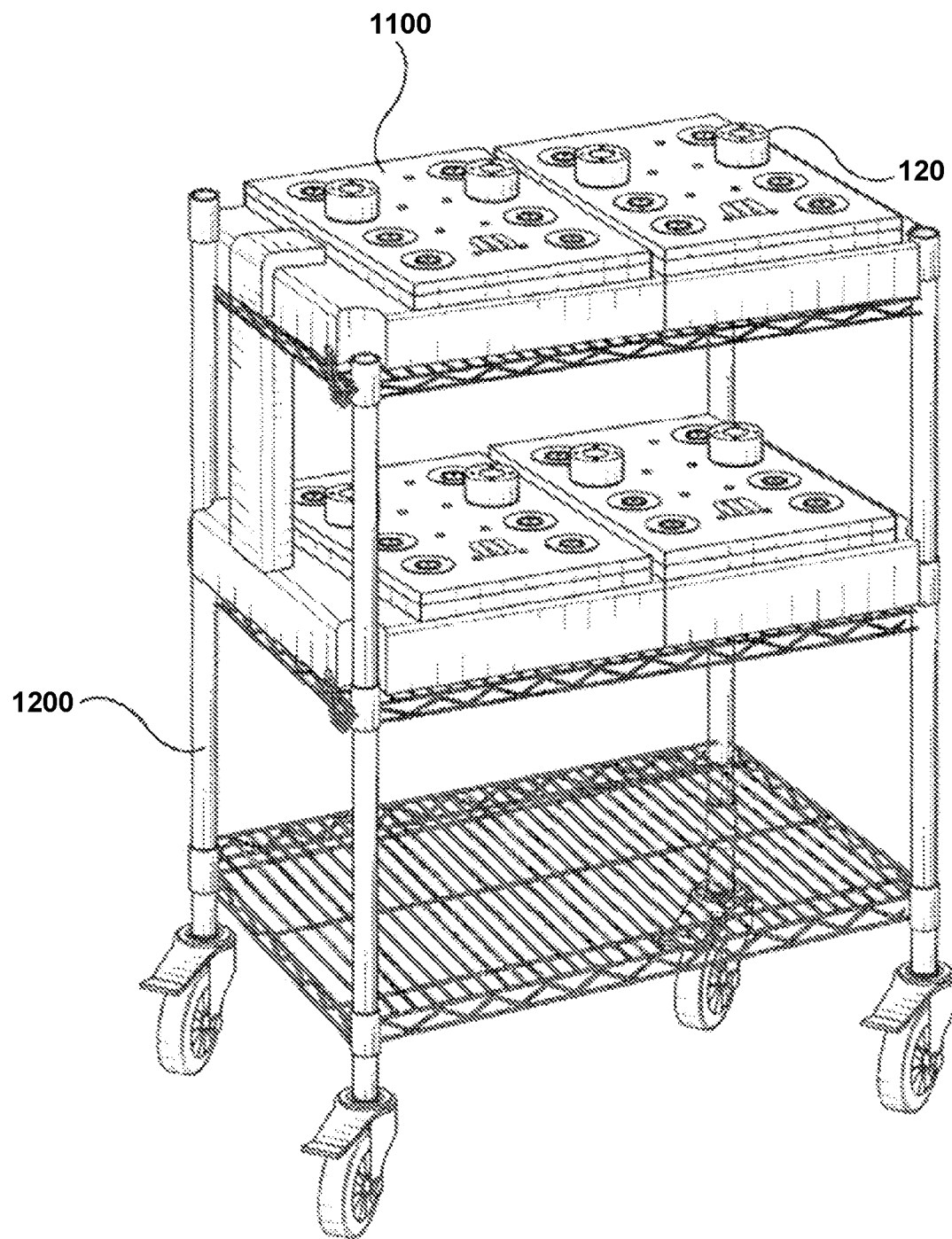
FIG. 12 illustrates a mobile transport according to an example embodiment.

FIG. 12 illustrates a mobile transport 1200 in accordance with an example embodiment. As shown, mobile transport 1200 has one or more shelves having incorporated thereon one or more group charging station 1100. In any of the embodiments disclosed herein, mobile transport 1200 may further include a mobile power unit, such as, for example, a mobile battery pack. As will be appreciated, mobile transport 1200 may allow for ease of communication between master controller 1020 and multiple light source controllers 1012.

FIG. 13A depicts a group charging station 1300 in accordance with an example embodiment that can be used as part of a lighting system with one or more lighting devices. The group charging station may include a surface 1308. The surface 1308 may be a flat surface. The surface 1308 may be made out of metal, plastic, other suitable materials, or a combination thereof. The surface 1308 may be used to charge a plurality of devices, in a manner such as described in exemplary embodiments herein. Having a flat surface may provide numerous benefits, such as ease and compactness of storage, use as a work surface, easy of placing a device on the surface to be charges, and aesthetic value.

Figure 13B:
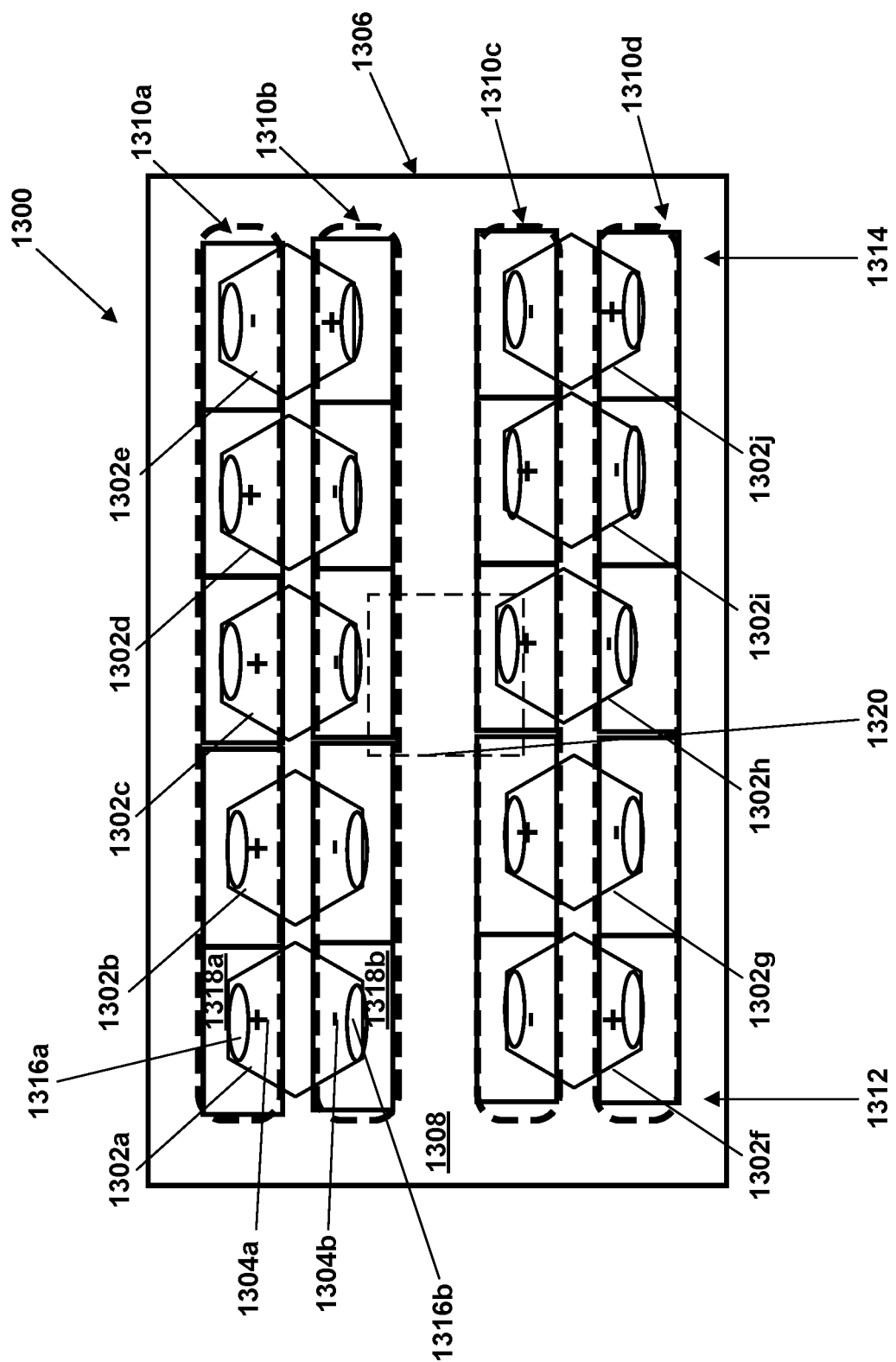

FIG. 13B depicts the group charging station 1300 in accordance with an example embodiment in use with lighting devices and with viewable components. Lighting devices may be on a power device, electric light source holder, or electric light source. The group charging station 1300 and other group charging stations disclosed herein have numerous advantages. For example, the group charging station 1300 may allow the charging of multiple power devices 1302*a* through 1302*j* in a compact space. The power devices 1302*a* through 1302*j* may include batteries to power lighting devices. The power devices 1302*a* through 1302*j* may removably couple to a lighting device or light source holder.

The ability to easily charge numerous power devices in a compact spaces may be critical for some applications where space is limited, such as, e.g., a cruise ship or restaurant. Another advantage is ease of use. The power devices 1302*a* and 1302*j* may simply be placed on the group charging platform 1306 and removed. There may be no need to plug in wires which can be a hassle, especially when using multiple devices. Also, since the power devices 1302*a* through 1302*j* are removably couplable to other components (e.g., components that may include a lighting device) the group charging station 1300 allows such components to be in use at another location (e.g., a dinner table or hotel room) with one power device while another power device is charging at a separate charging location suitable for storage.

The group charging station 1300 may include power devices 1302*a* through 1302*j*. Each power device 1302*a* through 1302*j* may include electrical contacts such as electrical contacts 1304*a* and 1304*b*. The electrical contacts may be any suitable shape of conductive material sufficient to receive electrical current. The group charging station 1300 includes a group charging platform 1306 which may be operable to concurrently charge the power devices 1302*a* through 1302*j*. "Concurrently" charge or form a conductive path means charge or form a conductive path during the same period of time. It does not necessarily mean the charging begins or ends at the same time or that the conductive path is initially formed at the same time. In other words, group charging station 1300 may allow multiple power device to charge at the same time and independently of one another. The group charging platform 1306 may include a surface 1308 formed by charging tiles 1310*a* through 1310*d*. "Formed" may include partially or fully formed. The charging tiles 1310*a* and 1310*c* may be tiles with positive polarity. The charging tiles 1310*b* and 1310*d* are tiles with negative polarity.

Electrical current may flow from the tiles with positive polarity through the tiles with negative polarity such that the charging tiles 1310*a* through 1310*d* complete electrical circuits when coupled. For example, the electrical contacts 1304*a* and 1304*b* may be operable to electrically couple to the charging tiles 1310*a* and 1310*b*, thereby completing an electrical circuit such that the power device 1302*a* is charging. Power devices 1302*b* through 1302*e* may also charge, and may concurrently receive electrical current from charging tiles 1310*a* and 1310*b*. As depicted by power device 1302*e*, the power devices may receive charge at any orientation.

The electrical contacts 1304*a* and 1304*b* may be spaced substantially the same distance for each power device 1302*a* through 1302*j*. The spacing may also be, for example, any distance of a range between the top of charging tile 1310*a* and the bottom of tile 1310*b*. This spacing may allow electrical contacts to electrically couple to both the charging tiles 1310*a* and 1310*b* when a power device is placed on the surface 1308.

The group charging station 1300 may include rows such that multiple power devices 1302*a* through 1302*e* and 1302*f* through 1302*j* may be charged side by side. A charging station may include any number of rows. For example, the embodiment of the group charging station 1300 shown in FIG. 13A may provide charging space for 10 power devices. Other embodiments can provide charging space for 1, 4, 10, 12, 20, 24, 36, or other amounts of power devices. A "plurality of rows" can mean a pair comprising a positive tile (a tile with positive polarity) and negative tile (a tile of negative plurality), multiple negative tiles, multiple positive tiles, or any combination thereof. For example, rows of charging tiles 1310*a* and 1310*b* may include a plurality of two rows. As depicted by example in FIG. 13B, the charging tiles 1310*a* through 1310*d* may include four rows. The rows of charging tiles 1310*a* through 1310*d* may extend along the surface 1308 in a first direction between a first end portion 1312 of the first plurality of rows and a second end portion 1314 such that the group charging platform 1306 and the power devices 1302*a* through 1302*b* are operable to concurrently form conductive paths thereby charging the power devices 1302*a* through 1302*j*. "Between" should be read to be inclusive throughout the disclosure and in this context includes the end portions. The first direction in FIG. 13B is left to right or right to left (when viewing FIG. 13B in landscape orientation). The rows of the charging tiles 1310*a* through 1310*d* may be long enough in the first direction such that the power devices 1302*a* through 1302*e* fit side by side on the charging tiles 1310*a* and 1310*b* and such that the power devices 1302*f* through 1302*j* fit side by side on the charging tiles 1310*c* and 1310*d*. Therefore, the rows of the charging tiles 1310*a* though 1310*d* may be long enough such that the power devices 1302*a* through 1302*j* may be concurrently charged.

While shown the same length in FIG. 13B, the rows of the charging tiles 1310*a* through 1310*d* may be of different lengths and therefore have separate end portions.

The group charging station 1300 may also be advantageous in that it may permit easy removable coupling and decoupling of the power devices 1302*a* through 1302*j* to the charging platform 1306. One way the group charging station may achieve easy removable coupling and decoupling is through the use of magnets. Power device 1302a may include power device magnets 1316a and 1316b. As shown by example in FIG. 13B, each power device 1302a through 1302j may include power device magnets. To mate with the power device magnets, the group charging platform 1306 may include a plurality of group charging platform magnets. The magnets may be disposed under the surface 1308 of the group charging station 1300. Each power device magnet and group charging platform magnet and may be operable to form, with the group charging platform magnet, a magnetic connection. Such magnetic connection may facilitate positive engagement and negative engagement of a power device to charging tiles such that a conductive path is formed from the group charging platform 1306 to a power device. For example, the power device magnets 1316a and 1316b may be operable to form, with the group charging platform magnets 1318a and 1318b, a plurality of magnetic connections. By establishing magnetic connection, the power device 1302a may be positioned such that (a) electrical contact 1304a positively engages charging tile 1310a and (b) electrical contact 1304b negatively engages charging tile 1310b. The power device 1302a may thereby electrically couple to the charging tiles 1310a and 1310b. Having positive and negative engagement may form a conductive path allowing the power device 1302a to be charged.

The power device 1302a may have additional power device magnets. The magnets may be rotationally positioned about the power device 1302a such that a magnetic connection may be formed that facilitates positive and negative engagement at multiple or any rotational position of the power device relative to the charging tiles 1310a and 1310b. In some embodiments, the power devices may also have one magnet. While shown with 20 magnets, the group charging platform may have any suitable number of group charging platform magnets. As with every discussion of any component herein, the reference to power device 1302a is made by way of example, and other power devices (shown by figure and not shown) may have the same or similar aspects. Note that group charging "station" or "system" should not be read to mean only stationary. The platform can be light weight and easy to move around. Additionally, the power devices may be removably couplable to the platform such that they can provide power to a lighting device at a movable location (e.g., a dinner table and then moved to another table or desk). The group charging stations or systems disclosed herein can be moveable, e.g., on a mobile transport, or additionally or alternatively by being lightweight and handheld. Power devices or even lighting devices, while they may be removably couplable to each other and the platform, may also be considered part of the group charging station as they may also be involved in the transfer of power. The group charging station 1300 may also be formed by smaller modular units, whereby the smaller modular units are removably joinable to each other. Each of the modular units may include one or more of the charging tiles 1310a through 1310d and may include any other suitable component, such as charging platform magnets 1318a and 1318b. The modular units, while separated from each other, may each be able to independently charge one or more power devices. When joined together, the modular units may charge additional power devices, and may also form conductive paths between each modular unit so that the charging station 1300 may provide power from a power outlet plugged in at a single plug-in location. The modular units may be joined to from the surface 1308.

Allowing multiple power devices 1302a through 1302j to charge on the same group charging platform 1306 with charging tiles may save space. In other systems, for example, the power devices 1302a through 1302j may not be able to charge as close together. For example, the surface 1308 of the group charging platform 1306 may be over 30%, 40%, or 50% covered by the plurality of charging tiles. The surface 1308 of the group charging platform 1306 may be over 95% covered with charging tiles to save space such that virtually wherever a power device is placed on the surface 1308, it will receive charge.

To add to ease of use and compactness for storage the surface 1308 may be a flush surface without any depressions or raised areas. A flush surface may be a flat metal surface. A flush surface may include no ridges or increases in height that would cause a power device to be lifted off the surface 1308 when moving a power device from one or a plurality of charging tiles to one or more other charging tiles. Since having a flush surface removes boundaries to where a power device may be charged, a flush surface may increase ease of use by allowing a user to place the power device at more locations along the surface 1308.

The surface 1308 may also be a ridged or indented surface. Such a surface 1308 may increase ease of use by providing boundaries or defined areas to place power devices 1302a through 1302j for charging.

To regulate current or track energy or time usage, the group charging platform 1306 may include a microcontroller 1320. The microcontroller 1320 may be disposed underneath the surface 1308. The microcontroller 1320 may be operable to regulate the current flowing through the plurality of charging tiles 1310a through 1310d. The microcontroller 1320 may also track current or historical usage of the power devices 1302a through 1302j, and determine, for example, how much power is used by each power device 1302a through 1302j. The microcontroller may also be operable to read and wirelessly communicate information about the plurality of power devices 1302a through 1302j, including for example, how much charge is in each power device or how much time is needed to fully charge the power devices 1302a through 1302j.

Figure 14:
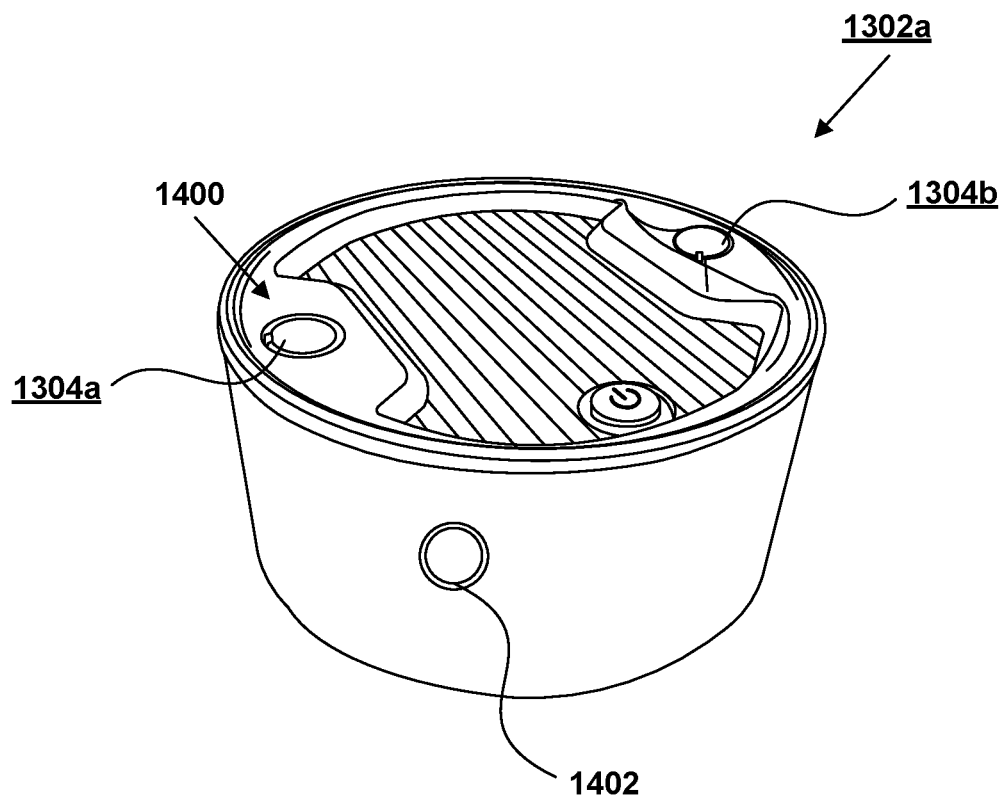
FIG. 14 is a perspective bottom view of a power device in accordance with some example embodiments.

FIG. 14 depicts a bottom view of the power device 1302a in accordance with some embodiments. The power device 1302a may include an outer portion 1400. The outer portion 1400 shown may be the bottom portion of the power device 1302a, and electrical contacts 1304a and 1304b are viewable. Other outer portions may be side portions or top portions. The electrical contacts 1304a and 1304b may be disposed on the outer portion 1400 such that, when the power device 1302a is placed on a charging platform, the electrical contacts 1304a and 1304b may be operable to electrically couple to the charging tiles, thereby forming a conductive path, allowing the power device 1302a to charge when placed on the surface (shown in FIGS. 13A and 13B as 1308). The electrical contacts 1304a and 1304b and charging tiles (shown in FIG. 13B as 1310a through 1310d) may be commonly spaced to achieve the conductive path. For example, if instead the electrical contacts 1304a and 1304b were spaced too widely, one or more electrical contacts would fail to contact a charging tile, which could prevent charging. If too narrowly spaced, both would be on either a positive or a negative tile, impeding or preventing charging. In other example embodiments, power devices may have additional electrical contacts to accommodate charging tiles of different shapes, sizes, or both. In some embodiments, electrical contacts 1304a and 1304b may be of sufficient size to accommodate variation in the arrangement and size of certain charging tiles.

To further add to ease of use, the power devices 1302a may have an indicator light 1402 that may indicate a percent charge of the respective power device. The indicator light may be positioned on a power device for display. For example, the indicator may include an LED light that emits green light when a power device is fully charged, a yellow light when the power device is charged to a certain percentage, and a red light to indicate the charge is below a useable level. In other embodiments, the indicator may be a number of bars of the same color that indicate the current charge level of the device. The indicator light may be any type of light such as an LED or, e.g., a screen with a percent number. While shown on the bottom portion 1400 of the power device 1302a, the indicator light may be placed on any suitable location on the power device. There also may be more than one indicator light (e.g., one for full charge and one for near empty). Indicator lights may be placed on a charging platform to indicate the charge of each power device. Indicator lights may also be located on or in the group charging station 1300 and may be part of a surface 1308, which may be a flush surface or rigid or indented surface. When the indicator lights are part of a flush surface, they may not substantially impede the smoothness of the surface 1308. The indicator lights may provide information about one or more power device or about the group charging station (e.g., whether the group charging station is plugged in or is charging a device, how many devices are charging, the percent charge of one or more power devices, and/or the time to fully and/or partially charge one or more power devices).

Figure 15:
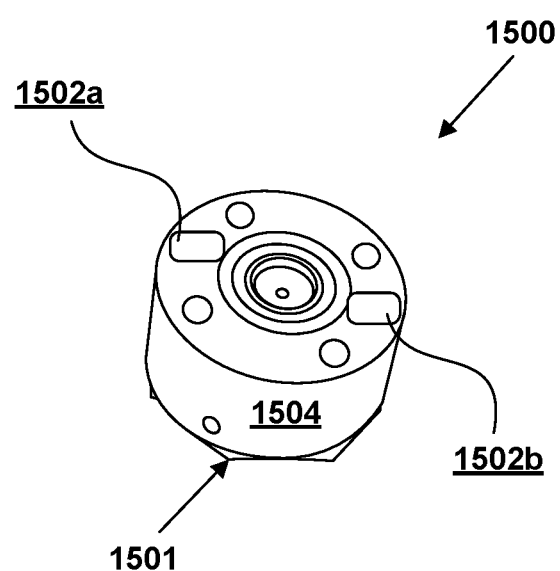
FIG. 15 is a perspective top view of a power device in accordance with some example embodiments.

To further allow compact charging, some systems disclosed herein may include power devices that are releasably couplable to each other to pass current from a group charging platform. Such systems may include "stackably chargeable" power devices. That is, the power devices may be stacked and charged while stacked. FIG. 15 depicts a stackably chargeable power device 1500 that can receive charge from a charging platform through electrical contacts on a bottom portion 1501 of the power device 1500 and pass current through routing electrical contacts 1502a and 1502b on a top portion 1504 of the power device 1500. The routing electrical contacts 1502a and 1502b may be operable to electrically couple to electrical contacts of another device, such as a power device, and pass current to that device when such a device is stacked on the power device 1500. Through these routing electrical contacts 1502a and 1502b, a group station system is operable to charge the power device 1500 and a power device stacked on top of it. With additional power devices with additional electrical contacts and routing electrical contacts, multiple power devices can be stacked on top of each other and all receive charge. With stackably chargeable power devices, the group charging station may be configured to charge up to 20, 30, 40, or more power devices at a time.

Figure 16:
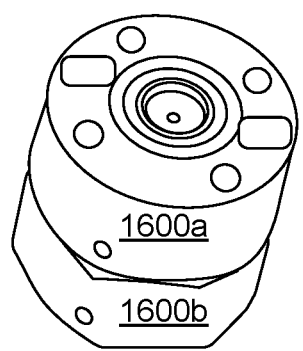
FIG. 16 is a perspective top view of two power devices in accordance with some example embodiments.

FIG. 16 shows stackably chargeable power devices 1600a and 1600b stacked in accordance with some embodiments. While FIG. 16 shows two stackably chargeable power devices 1600a and 1600b, some embodiments may allow for stacking three, four, five, or any suitable number of power devices such that each is stackably chargeable.

Figure 17:
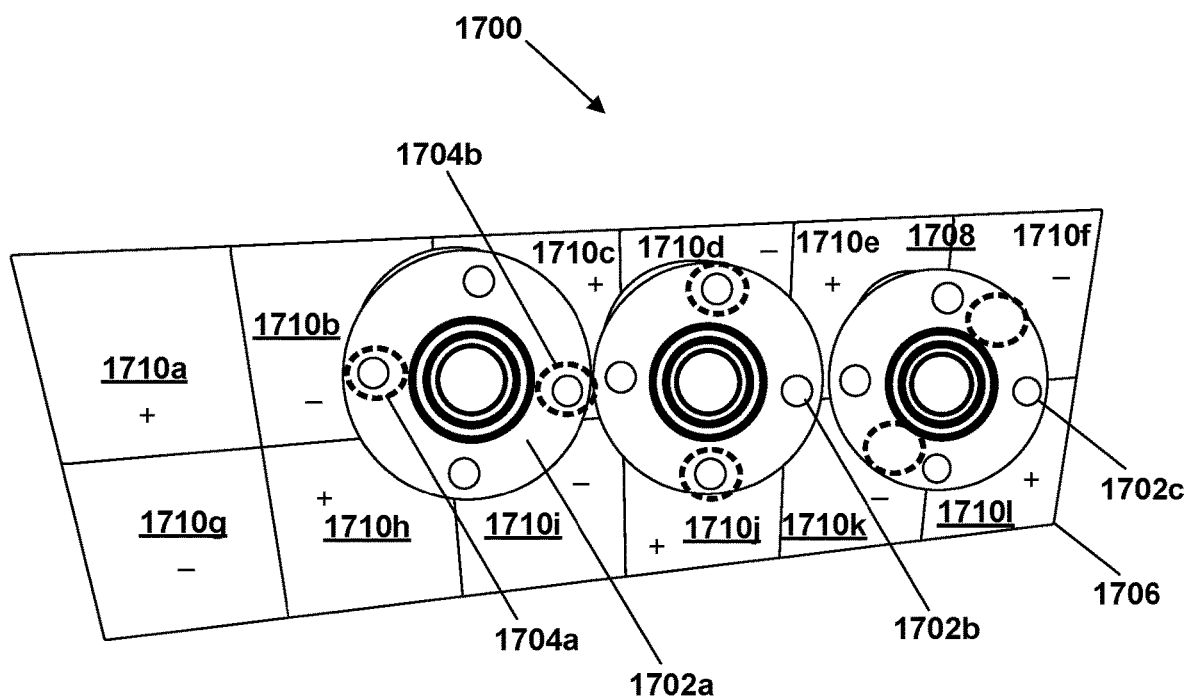
FIG. 17 is a perspective top view of a group charging station in accordance with some example embodiments.

The charging tiles may be arranged in numerous configurations. For example, FIG. 17 depicts a group charging station 1700 in accordance with some embodiments. The group charging station 1700 may include power devices 1702a and 1702b. The power devices 1702a, 1702b, and 1702c may each have electrical contacts. For example, power device 1702a may have electrical contacts 1704a and 1704b. While shown by dotted circle, the electrical contacts 1704a and 1704b are disposed on a bottom portion of the power device 1702a. The group charging station 1700 may include a group charging platform 1706 that may include a surface 1708 formed by charging tiles 1710a through 1710l. The charging tiles 1710a through 1710l may be arranged in a checkerboard pattern such that positive and negative tiles are alternating. With the checkerboard pattern, a power device, such as power device 1702a, may be placed at nearly any location on the surface 1708 such that at least one of its electrical contacts (1704a or 1704b) electrically couples to a positive tile of the charging tiles 1710a through 1710l and such that at least one of its electrical contacts couples (1704a or 1704b) to a negative tile of the charging tiles 1710a through 1710l. This way, the group charging station 1700 may concurrently charge multiple power devices in a tight space and the user may need not make additional effort to place the power devices 1702a, 1702b, 1702c at a precise location. Each of the charging tiles 1710a through 1710l may also have a width approximately equal to the distance between electrical contacts of the power devices, (e.g., 1704a, 1704b, and 1704c). This equal distance may allow the user to place the charging device at different orientations such that it may always or often contact a positive charging tile with one electrical contact and a negative tile with another electrical contact. For example, the power devices may contact a negative and positive charging tile pair in the horizontal direction (as shown by power device 1702a), a negative and positive charging tile pair in the vertical direction (as shown by power device 1702b), or a negative and positive charging tile pair in a diagonal direction (as shown by power device 1702c).

Figure 18B:
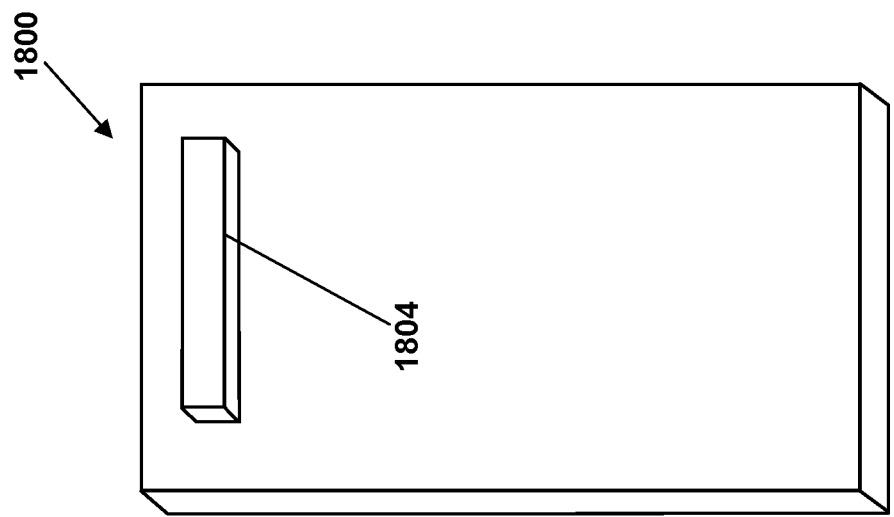
FIGS. 18A and 18B respectively depict rear and front perspective views of a group charging station with a vertically releasably mounted group charging platform in accordance with some embodiments.
Figure 18A:
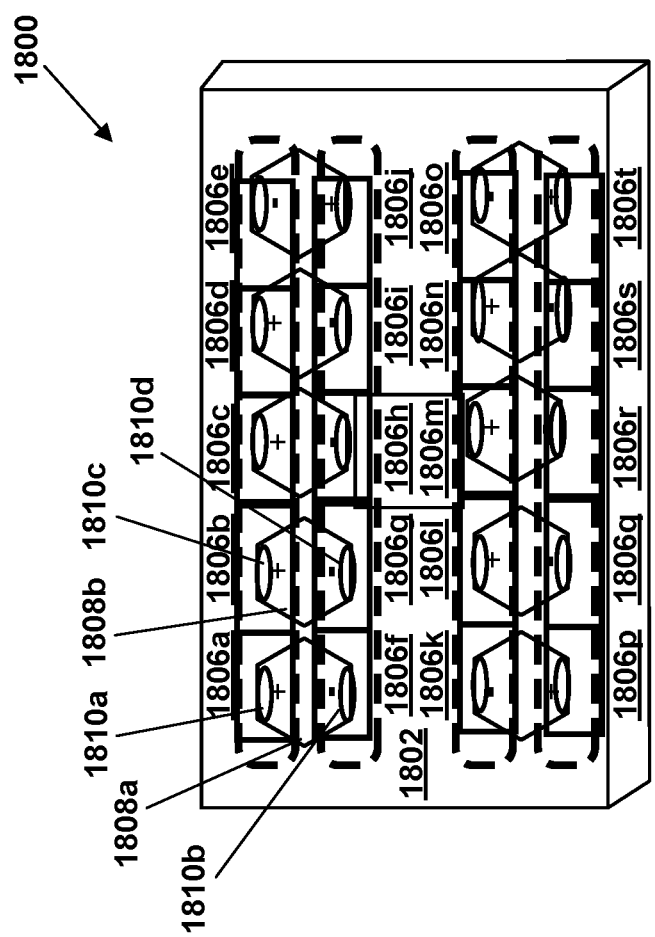

FIGS. 18A and 18B depict, respectively, the rear and front of a group charging station 1800 with a vertically releasably mounted group charging platform 1802 in accordance with some embodiments. The group charging platform 1802 may include a hanger 1804 to enable the platform 1802 to be hung on a wall, such that the group charging station 1800 is operable to hang vertically by the hanger 1804. The hanger 1804 is shown as a magnet 1804 but may include any component suitable for hanging the group charging station, such as a hook. The group charging platform 1802 may include group charging platform magnets, such as group charging platform magnets 1806a through 1806t disposed underneath a surface 1808 of the group charging platform 1802. The group charging station 1800 may include power devices 1808a and 1808b which may include power device magnets 1810a through 1810d. The power device magnets 1810a through 1810d and the group charging platform magnets 1806a through 1806t may be configured such that a magnetic force formed between the power device magnets 1810a through 1810d and the group charging platform magnets 1806a through 1806t is sufficient to hold the power devices 1808a and 1808b in place when the group charging platform 1802 is hanging vertically. The power device magnets 1810a through 1810d and the group charging platform magnets 1806a through 1806t are commonly spaced such that they may be operable to respectively mate thereby holding the power devices 1808a and 1808b in place. The vertical orientation may provide an advantage of the group charging station 1800 in that it allows the system to be used in tight spaces (e.g., hanging from a door or wall in a closet or small room).

The above description of one or more example embodiments and the examples included herein are provided to facilitate a greater understanding of the disclosure. It is to be understood that embodiments are not limited to the example embodiments described within this disclosure. Numerous modifications and variations therein will be apparent to those skilled in the art and remain within the scope of the disclosure. For example, any aspect of one embodiment in a figure or figures may be combined or substituted with any embodiment in another figure or figures. It is also to be understood that the terminology used herein is for describing specific example embodiments only and is not intended to be limiting.

In the above description, numerous specific details are set forth. However, it is to be understood that embodiments of the disclosed technology may be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the example embodiment(s) of the disclosed technology so described may include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

Further, in describing one or more example embodiments, certain terminology is used to for the sake of clarity. It is intended that each term contemplates its broadest meaning as understood by those skilled in the art and includes all technical equivalents that operate in a similar manner to accomplish a similar purpose.

The materials described herein as making up the various elements of certain example embodiments are intended to be illustrative only and not restrictive. Many suitable materials that would perform a same or a similar function as the materials described herein are intended to be embraced within the scope of the example embodiments. Such other materials not described herein can include, but are not limited to, materials that are developed after the time of the development of the invention.

One of ordinary skill will understand that the forgoing descriptions are provided as non-limiting examples, and that various alternatives or modifications are considered within the scope of the present disclosure, and the patentable scope of what is claimed is defined by within the claims and their equivalents.

Aspects of the invention are also provided by the following numbered clauses:

1. An electric lighting system comprising:
    a charger configured for electrical communication with a power source;
    an electric light source removably couplable to, and configured for electrical communication with, the charger, the electric light source comprising a lighting element; and
    a light source holder removably couplable to the electric light source,
    wherein, when the electric light source is removably coupled to the light source holder, the electric light source and the light source holder share a central axis.
2. The electric lighting system of clause 1, the charger further comprising first and second charging contacts disposed on an upper surface, and the electric light source further comprising first and second electric contacts disposed on a bottom surface, the first charging contact configured to contact the first electric contact and the second charging contact configured to contact the second electric contact, wherein contact between the first charging contact and the first electric contact allows electrical communication between the first charging contact and the first electric contact, and wherein contact between the second charging contact and the second electric contact allows electrical communication between the second charging contact and the second electric contact.
3. The electric lighting system of clause 2, wherein the first charging contact is configured as a charging pin and the second charging contact is configured as a charging ring, the charging pin being disposed proximate the center of the charging ring.
4. The electric lighting system of clause 3, wherein the charging pin and the first electric contact have opposing magnetic polarities, and wherein when the charging pin is brought proximate the first electric contact, a magnetic attraction force between the charging pin and the first electric contact causes the charging pin to transition from a retracted position to an extended position such that, when in the extended position, the charging pin is in electrical communication with the first electric contact.
5. The electric lighting system of clause 3, wherein the charging pin is configured to transition from a retracted position to an extended position and the charging ring is in a fixed position.
6. The electric lighting system of clause 2, wherein the electric light source further comprises a top surface, the top surface having at least one guide disposed thereon, the at least one guide positioned between (i) inner and outer perimeters of the top surface and (ii) first and second angular positions, the second angular position being a first clockwise distance from the first angular position.
7. The electric lighting system of clause 6, wherein the electric light source further comprises at least one magnet disposed on an underside of the top surface, the at least one magnet positioned (i) between inner and outer perimeters of the underside of the top surface and (ii) at a third proximate the first or second angular positions, but not between the first and second angular positions
8. The electric lighting system of clause 7, wherein the light source holder comprises a chimney and a base, the base having a cavity configured and sized to receive the electric light source, and the electric light source being sized to be received into the cavity.
9. The electric lighting system of clause 8, wherein the cavity comprises an attachment surface, the attachment surface having at least one groove disposed thereon, the at least one groove positioned between (i) inner and outer perimeters of the attachment surface and (ii) fourth and fifth angular positions, the fifth angular position being a second clockwise distance from the fourth angular position, the at least one groove configured to receive the at least one guide of the electric light source.
10. The electric lighting system of clause 9, wherein the base further comprises a light source surface, the light source surface being opposite the attachment surface, the light source surface having at least one magnet disposed thereon, the at least one magnet positioned (i) between inner and outer perimeters of the light source surface and (ii) at a sixth angular position proximate the fourth or fifth angular positions, but not between the fourth and fifth angular positions.
11. The electric lighting system of clause 10, wherein when the third angular position is proximate the first angular position, the sixth angular position is proximate the fourth angular position, and wherein when the third angular position is proximate the second angular position, the sixth angular position is proximate the fifth angular position.
12. The electric lighting system of clause 11, wherein the at least one magnet of the electric light source and the at least one magnet of the base have opposite magnetic polarities, and wherein when the top surface of the electric light source is brought proximate the attachment surface of the cavity, a magnetic attraction force between the at least one magnet of the electric light source and the at least one magnet of the base causes the base to rotate relative to the electric light source such that: (i) when the third angular position is proximate the first angular position, the magnetic attraction force causes base to rotate clockwise and (ii) when the third angular position is proximate the second angular position, the magnetic attraction force causes the base to rotate counterclockwise.
13. The electric lighting system of clause 12, wherein the electric light source further comprises a bottom surface having a static friction element disposed thereon, and wherein, when a rotational force sufficient to overcome the magnetic attraction force is applied to the light source holder, static friction between the static friction element and a supporting surface impedes rotation of the electric light source relative to the supporting surface such that the light source holder can (i) rotate relative to the electric light source and (ii) be uncoupled from the electric light source.
14. The electric lighting system of clause 8, wherein the chimney comprises a translucent material.
15. The electric lighting system of clause 1, the electric light source further comprising a rechargeable battery, wherein the rechargeable battery is in a charging state when the charger is in electrical communication with a power source and the electric light source is removably coupled to and electrical communication with the charger.
16. The electric lighting system of clause 1, wherein the electric light source is a first electric light source, the electric lighting system further comprising a second electric light source, the second electric light source removably couplable to, and configured for electrical communication with, the charger, the second electric light source interchangeable with the first electric light source.
17. An electric lighting system comprising:
a plurality of lighting modules, the plurality lighting modules comprising a primary lighting module and at least one secondary lighting module, each lighting module of the plurality of lighting modules comprising:
an electric light source comprising a lighting element;
a light source holder removably couplable to the electric light source; and
a controller configured for wireless communication, wherein the primary lighting module is configured to:
receive user input indicative of a user selection of a particular lighting mode;
operate the primary lighting module lighting element in accordance with the particular lighting mode; and
transmit commands indicative of the user selection of the particular lighting mode to the at least one secondary lighting module.
18. The electric lighting system of clause 17 further comprising a group charging station configured for electrical communication with a power source, the group charging station comprising a plurality of charging platforms, each charging platform configured for electrical communication with the group charging station, and wherein each electric light source is configured for electrical communication with a charging platform.
19. The electric lighting system of clause 18, wherein the group charging station is one of a plurality of group charging stations, the plurality of group charging stations being incorporated into a mobile transport.
20. The electric lighting system of clause 17, wherein a lighting mode comprises (i) a first variable selected from the group consisting of high intensity, medium intensity, and low intensity and (ii) a second variable selected from the group consisting of flicker and constant.
21. The electric lighting system of clause 20, wherein flicker simulates a flicker flame.
22. An electric lighting system comprising:
a plurality of lighting modules, each lighting module of the plurality of lighting modules comprising:
an electric light source comprising a lighting element;
a light source holder removably couplable to the electric light source; and a controller configured for wireless communication; and
a master controller configured to (i) receive user input indicative of a user selection of a particular lighting mode and (ii) transmit commands indicative of the user selection of the particular lighting mode to at least one lighting module of the plurality of lighting modules.
23. The electric lighting system of clause 22 further comprising a group charging station, wherein the group charging station includes the master controller, the group charging station further comprising:
a plurality of charging platforms, each charging platform configured for electrical communication with the group charging station, and wherein each electric light source is configured for electrical communication with a charging platform; and
a user interface operably coupled to the master controller, the user interface configured to receive the user input indicative of the user selection of the particular lighting mode.

24. A lighting system comprising:
a lighting device;
a plurality of power devices operable to power the lighting device, the plurality of power devices comprising a first power device and a second power device, the first power device comprising a first plurality of electrical contacts, the second power device comprising a second plurality of electrical contacts, the first plurality of electrical contacts, being spaced from each other substantially the same distance as the second plurality of electrical contacts; and
a group charging platform operable to concurrently charge the plurality of power devices, the group charging platform comprising a surface formed by a plurality of charging tiles, the first plurality of electrical contacts disposed on an outer portion of the first power device such that, when the first power device is placed on the charging platform, the first plurality of electrical contacts is operable to electrically couple to the plurality of charging tiles, thereby forming a first conductive path from the group charging platform to the first power device, the second plurality of electrical contacts disposed on an outer portion of the second power device such that, when the second power device is placed on the charging platform, the second plurality of electrical contacts is operable to electrically couple to the plurality of charging tiles, thereby forming a second conductive path from the group charging platform to the second power device.

25. The lighting system of clause 24 wherein the plurality of charging tiles comprises a first plurality of rows extending along the surface in a first direction between a first end portion of the first plurality of rows and a second end portion of the first plurality of rows such that the group charging platform and the first power device are operable to form the first conductive path and such that the group charging platform and the second power device are operable to form the second conductive path when the first power device and the second power device are placed on the plurality of charging tiles between the first end portion of the first plurality of rows and the second end portion of the first plurality of rows, the first plurality of rows being long enough in the first direction for the first power device and the second plurality device to be concurrently placed on the plurality of rows.

26. The lighting system of clause 25 wherein:
the plurality of charging tiles comprises a second plurality of rows extending along the surface in the first direction between a first end portion of the second plurality of rows and a second end portion of the second plurality of rows, such that the group charging platform and the power device are operable to form the first conductive path and the second conductive path when the first power device and the second power device are each placed on the plurality of charging tiles between the first end portion of the second plurality of rows and the second end portion of the second plurality of rows.

27. The lighting system of clause 24 wherein:
each of the plurality of charging tiles has a width approximately equal to a distance between the first plurality of electrical contacts; and
the plurality of tiles are arranged in a checkerboard pattern.

28. The lighting system of clause 24, wherein at least 50% of the surface is covered by the plurality of charging tiles.

29. The lighting system of clause 24, wherein:
the outer portion of the first power device is a bottom portion of the first power device;
the outer portion of the second power device is a bottom portion of the second power device;
the first power device further comprises a plurality of routing electrical contacts on a top portion of the first power device, the routing electrical contacts operable to electrically couple to the second plurality of electrical contacts of the second power device when the second power device is stacked on top of the first power device, the group charging station thereby operable to charge the first power device and the second power device when the second power device is stacked on top of the first.

30. The lighting system of clause 24, wherein the first power device further comprises an indicator light operable to emit light based upon the percent charge the first power device currently contains.

31. The lighting system of clause 24, wherein the charging platform further comprises a microcontroller disposed underneath the surface, the microcontroller operable to regulate the current flowing through the plurality of charging tiles.

32. The lighting system of clause 24, wherein the charging platform further comprises a microcontroller, the microcontroller operable to read and wirelessly communicate information about the plurality of power devices.

33. The lighting system of clause 24, wherein the surface is a flush surface without any depressions or raised areas.

34. The lighting system of clause 33, wherein the surface is a flat metal surface.

35. A group charging station comprising:
a plurality of power devices comprising:
a first power device comprising:
a first plurality of electrical contacts; and
a first plurality of power device magnets;
a second power device comprising:
a second plurality of electrical contacts; and
a second plurality of power device magnets; and
a group charging platform operable to concurrently charge the plurality of power devices, the group charging platform comprising:
a plurality of group charging platform magnets;
a surface formed by a plurality of charging tiles, wherein:
the first plurality of power device magnets and the second plurality of power device magnets are operable to form, with the plurality of group charging platform magnets, a plurality of magnetic connections that facilitate positive engagement and negative engagement of the plurality of power devices to the plurality of charging tiles such that a first conductive path is formed from the group charging platform to the first power device and a second conductive path is formed from the group charging platform to the second power device.

36. The group charging station of clause 35 wherein:
the group charging platform is operable to hang vertically by a hanger; and
the first plurality of power device magnets and the group charging platform magnets are configured such that a magnetic force formed between the first plurality of power device magnets and the group charging platform magnets is sufficient to hold the first power device in place when the group charging platform is hanging vertically.

37. The group charging station of clause 36, wherein the hanger comprises a hanger magnet.

38. The group charging station of clause 36, wherein the hanger comprises a hook.

39. The lighting system of clause 35, wherein the plurality of charging tiles comprises a first plurality of rows extending along the surface in a first direction between a first end portion of the first plurality of rows and a second end portion of the first plurality of rows, such that the group charging platform and the first power device are operable to form the first conductive path and such that the group charging platform and the second power device are operable to form the second conductive path when the first power device and the second power device are placed on the plurality of charging tiles between the first end portion of the first plurality of rows and the second end portion of the first plurality of rows, the first plurality of rows being long enough in the first direction for the first power device and the second plurality device to be concurrently placed on the plurality of rows.

40. The lighting system of clause 39 wherein:
the plurality of charging tiles comprises a second plurality of rows extending along the surface in the first direction between a first end portion of the second plurality of rows and a second end portion of the second plurality of rows, such that the group charging platform and the power device are operable to form the first conductive path and the second conductive path when the first power device and the second power device are each placed on the plurality of charging tiles between the first end portion of the second plurality of rows and the second end portion of the second plurality of rows.

41. The lighting system of clause 35, wherein the first power device further comprises an indicator light operable to emit light based upon the percent charge the first power device currently contains.

42. The lighting system of clause 35, wherein the charging platform further comprises a microcontroller disposed underneath the surface, the microcontroller operable to regulate the current flowing through the plurality of charging tiles.

43. The lighting system of clause 35, wherein the charging platform further comprises a microcontroller, the microcontroller operable to read and wirelessly communicate information about the plurality of power devices.

44. The lighting system of clause 35, wherein the surface is a flush surface without any depressions or raised areas.

45. The lighting system of clause 44, wherein the surface is a flat metal surface.

What is claimed is:
1. A lighting system comprising:
a plurality of lighting devices each comprising a light source and a light source holder configured to disburse light from the light source;
a plurality of power devices each operable to power one of the plurality of lighting devices, the plurality of power devices comprising a first power device and a second power device, the first power device comprising a first plurality of electrical contacts, the second power device comprising a second plurality of electrical contacts, the first plurality of electrical contacts, being spaced from each other substantially the same distance as the second plurality of electrical contacts; and
a group charging platform operable to concurrently charge the plurality of power devices, the group charging platform comprising a surface formed by a plurality of charging tiles, the first plurality of electrical contacts disposed on an outer portion of the first power device such that, when the first power device is placed on the charging platform, the first plurality of electrical contacts is operable to electrically couple to the plurality of charging tiles, thereby forming a first conductive path from the group charging platform to the first power device, the second plurality of electrical contacts disposed on an outer portion of the second power device such that, when the second power device is placed on the charging platform, the second plurality of electrical contacts is operable to electrically couple to the plurality of charging tiles, thereby forming a second conductive path from the group charging platform to the second power device, wherein
each of the plurality of charging tiles has a width approximately equal to a distance between the first plurality of electrical contacts; and
the plurality of charging tiles having either a positive polarity or a negative polarity and are arranged in a checkerboard pattern wherein polarity alternates in a first direction and a second direction; and
the plurality of power devices, when coupled to the group charging platform for concurrent charging, are decoupled from the plurality of lighting devices.

2. The lighting system of claim 1 wherein the plurality of charging tiles comprises a first plurality of rows extending along the surface in the first direction between a first end portion of the first plurality of rows and a second end portion of the first plurality of rows such that the group charging platform and the first power device are operable to form the first conductive path and such that the group charging platform and the second power device are operable to form the second conductive path when the first power device and the second power device are placed on the plurality of charging tiles between the first end portion of the first plurality of rows and the second end portion of the first plurality of rows, the first plurality of rows being long enough in the first direction for the first power device and the second power device to be concurrently placed on the first plurality of rows.

3. The lighting system of claim 2 wherein:
the plurality of charging tiles comprises a second plurality of rows extending along the surface in the first direction between a first end portion of the second plurality of rows and a second end portion of the second plurality of rows, such that the group charging platform and the power devices are operable to form the first conductive path and the second conductive path when the first power device and the second power device are each placed on the plurality of charging tiles between the first end portion of the second plurality of rows and the second end portion of the second plurality of rows.

4. The lighting system of claim 1, wherein at least 50% of the surface is covered by the plurality of charging tiles.

5. The lighting system of claim 1, wherein:
the outer portion of the first power device is a bottom portion of the first power device;
the outer portion of the second power device is a bottom portion of the second power device;
the first power device further comprises a plurality of routing electrical contacts on a top portion of the first power device, the routing electrical contacts operable to electrically couple to the second plurality of electrical contacts of the second power device when the second power device is stacked on top of the first power device, the group charging station thereby operable to charge the first power device and the second power device when the second power device is stacked on top of the first.

6. The lighting system of claim 1, wherein the first power device further comprises an indicator light operable to emit light based upon the percent charge the first power device currently contains.

7. The lighting system of claim 1, wherein the charging platform further comprises a microcontroller disposed underneath the surface, the microcontroller operable to regulate the current flowing through the plurality of charging tiles.

8. The lighting system of claim 1, wherein the charging platform further comprises a microcontroller, the microcontroller operable to read and wirelessly communicate information about the plurality of power devices.

9. The lighting system of claim 1, wherein the surface is a flush surface without any depressions or raised areas.

10. The lighting system of claim 9, wherein the surface is a flat metal surface.

11. A group charging station comprising:
a plurality of lighting devices each comprising a light source and a light source holder configured to disburse light from the light source;
a plurality of power devices, each operable to be coupled to one of the plurality of lighting devices to power one of the plurality of lighting devices, comprising:
a first power device comprising:
a first plurality of electrical contacts; and
a first plurality of power device magnets;
a second power device comprising:
a second plurality of electrical contacts; and
a second plurality of power device magnets; and
a group charging platform operable to concurrently charge the plurality of power devices, the group charging platform comprising:
a plurality of group charging platform magnets;
a surface formed by a plurality of charging tiles, wherein:
the first plurality of power device magnets and the second plurality of power device magnets are operable to form, with the plurality of group charging platform magnets, a plurality of magnetic connections that facilitate positive engagement and negative engagement of the plurality of power devices to the plurality of charging tiles such that a first conductive path is formed from the group charging platform to the first power device and a second conductive path is formed from the group charging platform to the second power device, and the plurality of magnetic connections is sufficient to hold the first and second power devices in place along the group charging platform;
each of the plurality of charging tiles has a width approximately equal to a distance between the first plurality of electrical contacts;
the plurality of charging tiles having either a positive polarity or a negative polarity and are arranged in a checkerboard pattern wherein polarity alternates in a first direction and a second direction; and
the plurality of power devices, when coupled to the group charging platform for concurrent charging, are decoupled from the plurality of lighting devices.

12. The group charging station of claim 11 wherein:
the group charging platform is operable to hang vertically by a hanger; and
the first plurality of power device magnets and the group charging platform magnets are configured such that a magnetic force formed between the first and second plurality of power device magnets and the group charging platform magnets is sufficient to hold the first and second power devices in place when the group charging platform is hanging vertically.

13. The group charging station of claim 12, wherein the hanger comprises a hanger magnet.

14. The group charging station of claim 12, wherein the hanger comprises a hook.

15. The group charging station of claim 11, wherein the plurality of charging tiles comprises a first plurality of rows extending along the surface in the first direction between a first end portion of the first plurality of rows and a second end portion of the first plurality of rows, such that the group charging platform and the first power device are operable to form the first conductive path and such that the group charging platform and the second power device are operable to form the second conductive path when the first power device and the second power device are placed on the plurality of charging tiles between the first end portion of the first plurality of rows and the second end portion of the first plurality of rows, the first plurality of rows being long enough in the first direction for the first power device and the second power device to be concurrently placed on the plurality of rows.

16. The group charging station of claim 15 wherein:
the plurality of charging tiles comprises a second plurality of rows extending along the surface in the first direction between a first end portion of the second plurality of rows and a second end portion of the second plurality of rows, such that the group charging platform and the power devices are operable to form the first conductive path and the second conductive path when the first power device and the second power device are each placed on the plurality of charging tiles between the first end portion of the second plurality of rows and the second end portion of the second plurality of rows.

17. The group charging station of claim 11, wherein the first power device further comprises an indicator light operable to emit light based upon the percent charge the first power device currently contains.

18. The group charging station of claim 11, wherein the charging platform further comprises a microcontroller disposed underneath the surface, the microcontroller operable to regulate the current flowing through the plurality of charging tiles.

19. The group charging station of claim 11, wherein the charging platform further comprises a microcontroller, the microcontroller operable to read and wirelessly communicate information about the plurality of power devices.

20. The group charging system of claim 11, wherein the surface is a flush surface without any depressions or raised areas.

21. The group charging system of claim 20, wherein the surface is a flat metal surface.

\* \* \* \* \*